US010439772B2

(12) United States Patent
Li et al.

(10) Patent No.: US 10,439,772 B2
(45) Date of Patent: Oct. 8, 2019

(54) REUSE-PATTERN BASED CO-ORDINATE MULTI-POINT TRANSMISSION VIA DISTRIBUTED MESSAGE EXCHANGE

(71) Applicant: QUALCOMM Incorporated, San Diego, CA (US)

(72) Inventors: Chong Li, Weehawken, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 205 days.

(21) Appl. No.: 15/187,968

(22) Filed: Jun. 21, 2016

(65) Prior Publication Data
US 2017/0366314 A1    Dec. 21, 2017

(51) Int. Cl.
| | |
|---|---|
| *H04W 72/04* | (2009.01) |
| *H04L 5/00* | (2006.01) |
| *H04W 16/14* | (2009.01) |
| *H04W 72/08* | (2009.01) |
| *H04B 7/024* | (2017.01) |
| *H04L 5/14* | (2006.01) |

(52) U.S. Cl.
CPC .......... *H04L 5/0035* (2013.01); *H04W 16/14* (2013.01); *H04W 72/048* (2013.01); *H04W 72/082* (2013.01); *H04B 7/024* (2013.01); *H04L 5/006* (2013.01); *H04L 5/0023* (2013.01); *H04L 5/0091* (2013.01); *H04L 5/14* (2013.01); *H04W 72/0426* (2013.01); *H04W 72/085* (2013.01)

(58) Field of Classification Search
CPC ... H04L 5/0035; H04L 5/0048; H04L 5/0057; H04L 1/0026; H04L 5/005; H04L 5/0051; H04W 72/042; H04W 24/10; H04W 72/082; H04W 88/08; H04W 72/085; H04W 92/20

See application file for complete search history.

(56) References Cited

U.S. PATENT DOCUMENTS

| | | | |
|---|---|---|---|
| 8,731,567 | B2 | 5/2014 | Zhang et al. |
| 8,798,021 | B2 | 8/2014 | Mangalvedhe et al. |
| 8,886,203 | B2 | 11/2014 | Katar et al. |

(Continued)

OTHER PUBLICATIONS

ISA/EP, International Search Report and Written Opinion of the International Searching Authority, Int'l Application No. PCT/US2017/032697, dated Sep. 8, 2017, European Patent Office, Rijswijk, NL, 17 pgs.

(Continued)

*Primary Examiner* — Sai Aung
(74) *Attorney, Agent, or Firm* — Holland & Hart LLP

(57) ABSTRACT

Methods, systems, and devices for wireless communications are described, including receiving, at a first base station, channel measurement information from a first user equipment (UE); identifying a zone associated with the first base station based at least in part on the received channel measurement information; receiving, from a second base station, zone information associated with one or more UEs that transmitted channel measurement information to the second base station; identifying a network reuse pattern for coordinated multi-point (CoMP) communication based at least in part on the identified zone and the received zone information; and transmitting a multi-point transmission to a second UE based at least in part on the identified network reuse pattern.

29 Claims, 16 Drawing Sheets

(56) References Cited

U.S. PATENT DOCUMENTS

| | | |
|---|---|---|
| 9,014,108 B2 | 4/2015 | Koo et al. |
| 9,337,906 B2* | 5/2016 | Prasad .................. H04B 7/024 |
| 9,730,164 B2* | 8/2017 | Xu ...................... H04W 52/242 |
| 2013/0021925 A1* | 1/2013 | Yin ........................ H04B 7/024 |
| | | 370/252 |
| 2013/0039203 A1* | 2/2013 | Fong ..................... H04B 7/024 |
| | | 370/252 |
| 2014/0211734 A1* | 7/2014 | Seo ..................... H04J 11/0056 |
| | | 370/329 |
| 2014/0369219 A1* | 12/2014 | Wang .................... H04B 7/024 |
| | | 370/252 |
| 2015/0029995 A1 | 1/2015 | Krishnamurthy et al. |
| 2015/0270882 A1 | 9/2015 | Shattil |
| 2016/0037541 A1* | 2/2016 | Kim ................... H04W 72/085 |
| | | 370/329 |
| 2016/0066340 A1 | 3/2016 | Zhang et al. |

OTHER PUBLICATIONS

Nsn et al., "Discussion on Architectures Supporting Inter-eNB CoMP," 3GPP TSG-RAN WG1 Meeting #76, R1-140562, Prague, Czech Republic, Feb. 10-14, 2014, 4 pgs., 3rd Generation Partnership Project.

* cited by examiner

REUSE-PATTERN BASED CO-ORDINATE MULTI-POINT TRANSMISSION VIA DISTRIBUTED MESSAGE EXCHANGE

BACKGROUND

The following relates generally to wireless communications, and more specifically to reuse-pattern based co-ordinate multi-point transmission (CoMP) via distributed message exchange.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of base stations, each simultaneously supporting communication for multiple communication devices, which may be otherwise known as user equipment (UE).

In some wireless communications systems, various transmitting devices may cause unintended interference to other nearby transmitting or receiving devices. This interference may be based on one or more CoMP-related operations or transmissions that interfere with the other devices. This CoMP-related interference, however, may be self-defeating—by making the CoMP transmissions that are otherwise designed to increase reliability less reliable because of interference related to multiple CoMP transmissions.

SUMMARY

The described techniques relate to improved methods, systems, devices, or apparatuses that support reuse-pattern based CoMP via distributed message exchange. Generally, the described techniques provide for CoMP via distributed message exchange to enable identifying a network reuse pattern that allows for coordinated CoMP transmissions and decreases interference. A first device (e.g., a base station) may receive channel measurement or other information from a second device (e.g., a UE). The first device may identify at least one zone related to the received information or the second device, where the at least one zone may include a serving zone, or an exclusive zone, or a combination thereof. The first device may also receive zone information, which may relate to one or more other zones, associated with other devices.

The first device may identify a network reuse pattern based on the identified zone, the received zone information from one or more other devices, some combination, or other information. At least some parts of the received zone information, other information, or the network reuse pattern may be transmitted to one or more other devices (e.g., base stations) in a distributed message exchange in addition to or as an alternative to a centralized coordination operation by a controller. This distributed message exchange may enable one or more devices (e.g., base stations) to receive information related to a network reuse pattern and facilitate CoMP transmissions that reduce interference. In some cases, this interference reduction may be accomplished by time shifting or time division of various CoMP transmissions to decrease the interference that a device may create when facilitating CoMP transmissions. This time division may be based on the network reuse pattern related to the identified zones or zone information and the distributed message exchange.

A method of wireless communications is described. The method may include receiving, at a first base station, channel measurement information from a first UE, identifying a zone associated with the first base station based at least in part on the received channel measurement information, receiving, from a second base station, zone information associated with one or more UEs that transmitted channel measurement information to the second base station, identifying a network reuse pattern for CoMP communication based at least in part on the identified zone and the received zone information, and transmitting a multi-point transmission to a second UE based at least in part on the identified network reuse pattern.

An apparatus for wireless communications is described. The apparatus may include means for receiving, at a first base station, channel measurement information from a first UE, means for identifying a zone associated with the first base station based at least in part on the received channel measurement information, means for receiving, from a second base station, zone information associated with one or more UEs that transmitted channel measurement information to the second base station, means for identifying a network reuse pattern for CoMP communication based at least in part on the identified zone and the received zone information, and means for transmitting a multi-point transmission to a second UE based at least in part on the identified network reuse pattern.

Another apparatus for wireless communications is described. The apparatus may include a processor, memory in electronic communication with the processor, and instructions stored in the memory. The instructions may be operable to cause the processor to receive, at a first base station, channel measurement information from a first UE, identify a zone associated with the first base station based at least in part on the received channel measurement information, receive, from a second base station, zone information associated with one or more UEs that transmitted channel measurement information to the second base station, identify a network reuse pattern for CoMP communication based at least in part on the identified zone and the received zone information, and transmit a multi-point transmission to a second UE based at least in part on the identified network reuse pattern.

A non-transitory computer readable medium for wireless communications is described. The non-transitory computer-readable medium may include instructions operable to cause a processor to receive, at a first base station, channel measurement information from a first UE, identify a zone associated with the first base station based at least in part on the received channel measurement information, receive, from a second base station, zone information associated with one or more UEs that transmitted channel measurement information to the second base station, identify a network reuse pattern for CoMP communication based at least in part on the identified zone and the received zone information, and transmit a multi-point transmission to a second UE based at least in part on the identified network reuse pattern.

Some examples of the method, apparatus, and non-transitory computer-readable medium described above may further include processes, features, means, or instructions for transmitting zone information based at least in part on the identified zone to a third base station.

Some examples of the method, apparatus, and non-transitory computer-readable medium described above may further include processes, features, means, or instructions for transmitting a multi-point transmission to the first UE based at least in part on the identified network reuse pattern.

Some examples of the method, apparatus, and non-transitory computer-readable medium described above may further include processes, features, means, or instructions for broadcasting a reference signal to the first UE, wherein the channel measurement information may be received in response to the broadcasting.

In some examples of the method, apparatus, and non-transitory computer-readable medium described above, the channel measurement information comprises: a channel quality indicator, or a precoding matrix indicator, or a combination thereof.

In some examples of the method, apparatus, and non-transitory computer-readable medium described above, receiving the channel measurement information comprises: receiving a reference signal from the first UE.

Some examples of the method, apparatus, and non-transitory computer-readable medium described above may further include processes, features, means, or instructions for identifying a zone associated with the second base station based at least in part on the received zone information.

Some examples of the method, apparatus, and non-transitory computer-readable medium described above may further include processes, features, means, or instructions for comparing a received power of the channel measurement information with a threshold. Some examples of the method, apparatus, and non-transitory computer-readable medium described above may further include processes, features, means, or instructions for identifying the zone associated with the second base station based at least in part on the comparing.

In some examples of the method, apparatus, and non-transitory computer-readable medium described above, the identified zone comprises: an exclusive zone, or a serving zone, or a combination thereof.

In some examples of the method, apparatus, and non-transitory computer-readable medium described above, the identified zone may be based at least in part on a location of the first base station or the first UE.

Some examples of the method, apparatus, and non-transitory computer-readable medium described above may further include processes, features, means, or instructions for receiving the zone information from the second base station may be independent of joint precoding information.

Some examples of the method, apparatus, and non-transitory computer-readable medium described above may further include processes, features, means, or instructions for transmitting zone information based at least in part on the identified zone to a plurality of base stations within a network via a distributed message.

A method of wireless communications is described. The method may include transmitting zone information to a base station in a CoMP association and receiving a multi-path transmission based at least in part on an identified zone related to the CoMP association and the transmitted zone information.

An apparatus for wireless communications is described. The apparatus may include means for transmitting zone information to a base station in a CoMP association and means for receiving a multi-path transmission based at least in part on an identified zone related to the CoMP association and the transmitted zone information.

Another apparatus for wireless communications is described. The apparatus may include a processor, memory in electronic communication with the processor, and instructions stored in the memory. The instructions may be operable to cause the processor to transmit zone information to a base station in a CoMP association and receive a multi-path transmission based at least in part on an identified zone related to the CoMP association and the transmitted zone information.

A non-transitory computer readable medium for wireless communications is described. The non-transitory computer-readable medium may include instructions operable to cause a processor to transmit zone information to a base station in a CoMP association and receive a multi-path transmission based at least in part on an identified zone related to the CoMP association and the transmitted zone information.

DETAILED DESCRIPTION

Figure 1:
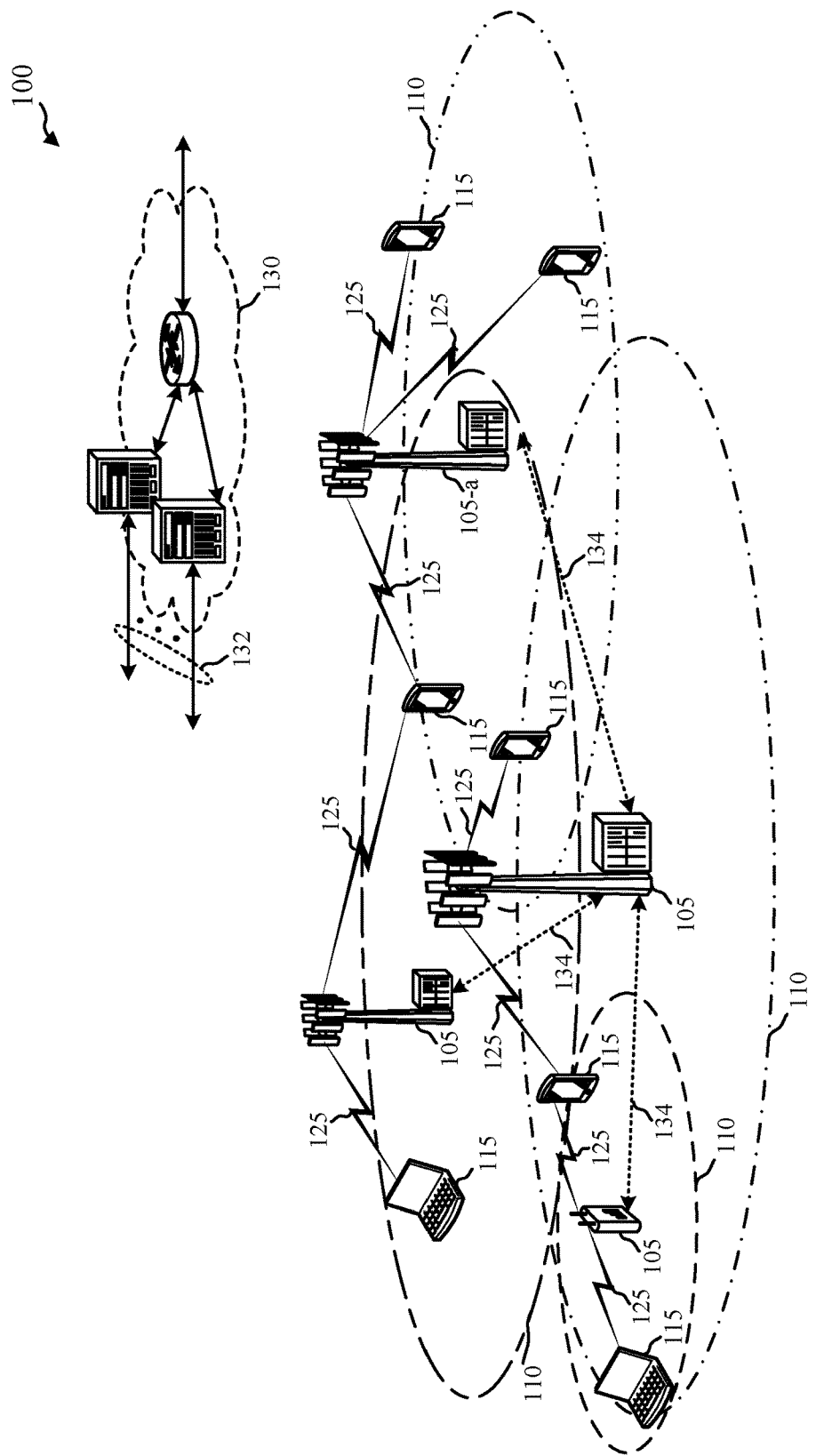
FIG. 1 illustrates an example of a system for wireless communications that supports reuse-pattern based co-ordinate multi-point transmission via distributed message exchange in accordance with aspects of the present disclosure.

In various situations, certain information to be transmitted may be more important or critical than other information or applications and may call for higher reliability than other applications due to the circumstances. Some examples may include emergency transmissions from a mobile device, from a vehicle during various times, or in a structure when an emergency has occurred. To facilitate the transmission of critical information, CoMP may be used—enabling one or more base stations to serve a UE or other device and facilitating the transmission of this critical information when single point transmissions may not be sufficient or may be less reliable.

In some cases, however, having multiple CoMP transmissions for multiple devices (e.g., UEs) during the same time may cause severe interference. For example, two base stations serving a first UE may enable CoMP transmissions, but a third base station serving another UE may cause severe interference to the CoMP transmissions of the first two base stations serving the first UE. This interference may be based on how close the interfering base station is located to one or more other devices, and one or more related zones based on this relationship may be identified. This interference may, in some cases, become self-defeating where the CoMP transmissions that are each otherwise designed to facilitate the transmission of critical information are themselves causing severe interference to each and are preventing or at least hindering the transmission of the critical information.

The present disclosure describes methods and techniques for CoMP via distributed message exchange to identify a network reuse pattern facilitating multiple transmissions. A first device (e.g., a base station) may receive channel measurement or other information from a second device (e.g., a UE). The first device may identify at least one zone related to the received information or the second device, where the at least one zone may include a serving zone, or an exclusive zone, or a combination thereof. The first device may receive one or more zones or zone information (which may relate to one or more other zones) associated with other devices.

The first device may identify a network reuse pattern based on the identified zone and the received zone information, among other information. At least some of the identified zone, the received zone information, or the network reuse pattern may be transmitted to one or more other devices (e.g., base stations) in a distributed message exchange in addition to or as an alternative to a centralized coordination operation by a controller. This distributed message exchange may enable one or more devices (e.g., base stations) to receive information to populate an association table to facilitate identification of network reuse information and CoMP transmissions that reduce interference. As part of this message exchange, one or more UEs may transmit zone information to a base station to facilitate identifying of one or more associated zones. A UE may also receive a multi-point transmission based at least in part on an identified zone related to the CoMP association and the transmitted zone information.

In some cases, this interference reduction may be accomplished by time shifting or time division multiplexing of various CoMP transmissions to decrease the interference that a device may create when facilitating CoMP transmissions based on a network reuse pattern. In other cases, this interference reduction may be accomplished by selective multi-point transmissions. In some cases, discussion of multi-point transmissions and related operations are synonymous with multi-path transmissions and related operations, and single point transmissions and related operations are synonymous with single path transmissions.

Aspects of the disclosure are initially described in the context of a wireless communications system. Specific examples are then described for CoMP operations and transmissions related to identifying a network reuse pattern from zone information and other information, and distributing the network reuse pattern via a distributed message exchange between various devices of the same or of different types. Aspects of the disclosure are further illustrated by and described with reference to apparatus diagrams, system diagrams, and flowcharts that relate to reuse-pattern based co-ordinate multi-point transmission via distributed message exchange.

FIG. 1 illustrates an example of a wireless communications system 100 in accordance with various aspects of the present disclosure. The wireless communications system 100 includes base stations 105, 105-a, UEs 115, and a core network 130. In some examples, the wireless communications system 100 may be a LTE (or LTE-Advanced) network.

In some deployments, wireless communications system 100 may facilitate coordinated multi-point (CoMP) transmissions in which two or more base stations may transmit to or receive from a UE. Such CoMP transmissions may use one or more of several CoMP schemes, including, but not limited to, joint processing and coordinated scheduling or beamforming. In some cases, joint processing may occur where there is coordination between multiple entities (e.g., base stations) that are simultaneously transmitting to or receiving or from one or more UEs. In some cases, coordinated scheduling (CS) or coordinated beamforming (CB) occurs where a UE is transmitting with a single transmission or reception point (e.g., a base station), but the communication is made with an exchange of control among several coordinated entities.

In some CoMP applications, the coordination or joint processing between base stations is a process conducted by the host eNodeB in a centralized manner. Under certain circumstances, however, distributed coordination via message exchange is preferable, as described in this disclosure. In CoMP, the coordination or joint processing is an approach towards maximizing spectral efficiency for some UEs, including, but not limited to, low-mobility UEs. In some examples, however, a transmitter (e.g., a Remote Radio Head) can be selected/scheduled to serve one UE, but may at the same time cause strong interference to other UEs in the area or within at least part of the same network. Thus an identified network reuse pattern based on channel measurement information and zones or zone information may be considered in selecting and scheduling multi-point transmissions.

The UEs 115 may be configured to collaboratively communicate with multiple base stations 105, 105-a through, for example, CoMP or other schemes. CoMP, as mentioned above, may include techniques for coordination of transmission and reception by a number of base stations to improve overall transmission quality for UEs as well as increasing network and spectrum utilization. CoMP techniques may utilize backhaul links 132 and/or 134 for communication between base stations 105, 105-a to coordinate communications related to the UEs 115. CoMP techniques may additionally or alternatively use communication links 125 for communication between base stations 105, 105-a to coordinate communications related to the UEs 115.

Base stations 105, 105-a may wirelessly communicate with UEs 115 via one or more base station antennas. Each base station 105, 105-a may provide communication coverage for a respective geographic coverage area 110. Communication links 125 shown in wireless communications system 100 may include uplink (UL) transmissions from a UE 115 to a base station 105, 105-a, or downlink (DL) transmissions, from a base station 105, 105-a to a UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal (AT), a handset, a user agent, a client, or like terminology. A UE 115 may also be a cellular phone, a wireless modem, a handheld device, a personal computer, a tablet, a personal electronic device, an MTC device, etc.

Base stations 105, 105-*a* may communicate with the core network 130 and with one another. For example, base stations 105, 105-*a* may interface with the core network 130 through backhaul links 132 (e.g., S1). Base stations 105, 105-*a* may communicate with one another over backhaul links 134 (e.g., X2) either directly or indirectly (e.g., through core network 130). Base stations 105, 105-*a* may perform radio configuration and scheduling for communication with UEs 115, or may operate under the control of a base station controller (not shown). In some examples, base stations 105, 105-*a* may be macro cells, small cells, hot spots, or the like. Base stations 105, 105-*a* may also be referred to as eNodeBs (eNBs) 105, 105-*a*.

In some cases, base station antennas may be located within one or more antenna arrays. One or more base station antennas or antenna arrays may be collocated at an antenna assembly, such as an antenna tower. In some cases, antennas or antenna arrays associated with a base station 105, 105-*a* may be located in diverse geographic locations. A base station 105, 105-*a* may multiple use antennas or antenna arrays to conduct beamforming operations for directional communications with a UE 115.

A UE 115 may be configured to collaboratively communicate with multiple base stations 105, 105-*a* through, for example, Multiple Input Multiple Output (MIMO), Coordinated Multi-Point (CoMP), or other schemes. MIMO techniques use multiple antennas on the base stations or multiple antennas on the UE to take advantage of multi-point environments to transmit multiple data streams. CoMP includes techniques for dynamic coordination of transmission and reception by a number of eNBs to improve overall transmission quality for UEs as well as increasing network and spectrum utilization.

In some examples, one or more base stations (e.g., base station 105-*a*) may be positioned within a range or a zone of one or more other devices (e.g., UE 115, base station 105). Based on this positioning, base station 105-*a* may create interference when it facilitates communication with one or more UEs or other devices using CoMP. One or more base stations may receive zone information relating to one or more UEs or other devices to facilitating identifying one or more related zones. This information may be based on channel measurement information or other information.

In some cases, the received channel measurement or other information may be based on information received at various intervals or in response to detected conditions. For examples, the channel measurement information may be collected or received at various intervals based on an identified type of network. This identified network type may be or related to the mobility of one or more devices within a network, including, but not limited to, how often one or more devices move a predetermined distance, based on how far devices move when being repositioned, other characteristics, or some combination. Additionally or alternatively, the received channel measurement or other information may be based on a determination about the application-specific network. For example, if the network is designed for a less-mobile network (e.g., factory automation), the channel measurement (or other operation) may be performed at a first, longer interval (e.g., 5 minutes, 30 minutes, every hour), while the channel measurement may be performed at a second, shorter interval (e.g., 80 ms, 100 ms) for a more mobile network application (e.g., mobile phone, mobile vehicle). As discussed below, the association table (or other information organization tool) may also be updated at the same rate depending on the application, or a different rate depending on the application, the results of the channel measurement, other information, or some combination.

A first base station (e.g., base station 105-*a*) may identify a zone associated with itself based on received information and populate a component of an association table. The first base station may also receive zone information or other information associated with one or more other devices (e.g., UEs) that may transmit channel measurement information or other information to another device (e.g., base station 105) that then relays this information to the first base station (e.g., base station 105-*a*) for populating the association table. In some cases, the first base station may identify a network reuse pattern for CoMP communications based on at least some of the received information, such as that included in the association table. In some examples, zone information based on the identified zone may be transmitted to another device (e.g., base station 105) to facilitate identification of a network reuse pattern.

Figure 2:
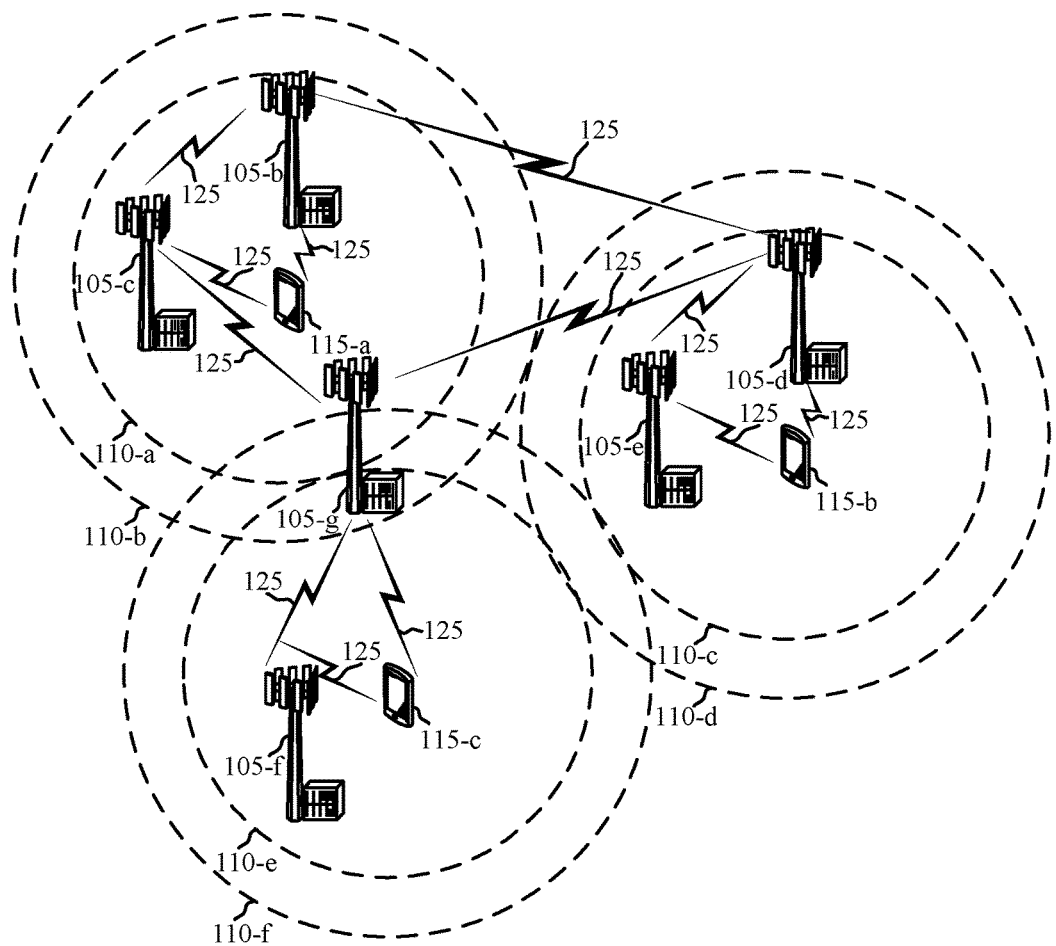
FIG. 2 illustrates an example of a system that supports reuse-pattern based co-ordinate multi-point transmission via distributed message exchange in accordance with aspects of the present disclosure.

FIG. 2 illustrates an example of a system 200 for reuse-pattern based co-ordinate multi-point transmission via distributed message exchange. In some cases, system 200 may represent aspects of techniques performed by a UE 115 or base station 105, 105-*a* or within a geographic coverage area 110 as described with reference to FIG. 1.

In some examples, system 200 may be an example of a wireless communications system. For example, system 200 may utilize CoMP techniques and method to facilitate receiving and transmitting zone information, identifying a network reuse pattern for CoMP communication, and facilitating transmitting one or more CoMP transmissions.

In some examples, the devices shown in FIG. 2 may relate to a single cell, multiple cells, a micro-cell, multiple micro-cells, or other organization within a network. As a first example, UE 115-*a* may be in communication with base stations 105-*b* and 105-*c* to facilitate CoMP transmissions via communication links 125. In addition, base stations 105-*b* and 105-*c* may be in communication with each other via a communication link 125. Moreover, multiple base stations in different cells or micro-cells (among other examples) may be in communication, as shown by base stations 105-*b* and 105-*d* being in communication via one or more communication links 125. Similarly, UE 115-*b* may be in communication with base stations 105-*d* and 105-*e* to facilitate CoMP transmissions via communication links 125. In addition, base stations 105-*d* and 105-*e* may be in communication with each other via a communication link 125. Moreover, multiple base stations in different cells or micro-cells (among other examples) may be in communication, as shown by base stations 105-*g* and 105-*d* being in communication via one or more communication links 125. In addition, UE 115-*c* may be in communication with base stations 105-*f* and 105-*g* to facilitate CoMP transmissions via communication links 125. In addition, base stations 105-*f* and 105-*g* may be in communication with each other via a communication link 125.

In some examples, a first device may request information from one or more other devices. For example, a base station 105-*b* may transmit a reference signal (e.g., a CSI-RS) or another request to one or more UEs (e.g., 115-*a*) in a DL measurement scheme. The one or more UEs may receive the request and perform one or more operations based on the received request. In some cases, the operations may include identifying one or more characteristics associated with the received request. These characteristics, may include, but are not limited to power measurements, channel measurement information, other information, or some combination. In some cases, the base station (e.g., base station 105-*b*) may be configured to broadcast a CSI-RS at or during one or more intervals to account for movement of related UEs and to determine mobility of the devices within the network, and adjust future reference signal transmissions and other operations based on the results of the reference signal transmissions. Although this example is described in the context of a DL measurement scheme, the present disclosure is not limited to this example and may also be used for UL measurement schemes and other examples.

In some examples, in response to the CSI-RS or other request, one or more UEs (or each UE) may transmit information to the base station based on the received reference signal or request. This information may include, among other things, channel measurement information, channel quality information (CQI), precoding matrix indicator (PMI), other information, or some combination. In some cases, the channel measurement information may include, but is not limited to, channel quality information (CQI), precoding matrix indicator (PMI), and the like.

Based on the information received from one or more UEs based on the CSI-RS (or other request), one or more base stations may identify one or more zones related to a UE, a base station, or one or more devices. In some cases, one or more base stations will identify or construct various zones (e.g., serving zone, exclusive zone, other zone(s)) based on the information received from one or more UEs (e.g., CQI, PMI). In some cases, this identification of the one or more zones may be performed on a per base station basis (e.g., each base station may broadcast a reference signal and receive information back from each UE to identify or construct one or more zones relating to one or more UEs).

As another example, a UE may initiate transmission of information (e.g., channel measurement information) to one or more other devices (e.g., base stations). For example, a UE 115-a may transmit a reference signal (e.g., a sounding reference signal (SRS)) or other information to one or more base stations (e.g., base stations 105-b) in a UE-centric measurement scheme. In some cases, the UE may broadcast the SRS to a base station on a dedicated channel. The one or more base stations may receive the transmission and perform one or more operations based on the received transmission. In some cases, the operations may include identifying one or more characteristics associated with the received transmission from the UE(s). These characteristics, may include, but are not limited to power measurements, channel measurement information, other information, or some combination base on one or more transmissions from one or more UEs.

In some cases, the UE (e.g., UE 115-a) may be configured to broadcast the SRS at or during one or more intervals to account for movement of related UEs and to facilitate determining mobility of the devices within the network by a UE or a base station, and facilitate adjustment future reference signal transmissions and other operations based on the results of the reference signal transmissions by a UE or a base station. As an example, additionally or alternatively to transmissions based on one or more time intervals, in a UE-centric scheme one or more UEs may be programmed to trigger and broadcast one or more SRS transmissions when movement is detected, when a predetermined distance associated with movement is satisfied, based on other characteristics, or some combination. In some examples, a UE may transmit an SRS on a dedicated channel to one or more base stations to facilitate identifying a zone or a network reuse pattern.

The one or more UEs may make one or more determinations or identifications regarding zones or zone information. These one or more determinations or identifications may include the UE determining one or more geographic coverage areas 110 (e.g., geographic coverage area 110-a, geographic coverage area 110-b) that relate to or correspond to one or more zones. In some cases, different geographic areas may relate to or correspond to one or more zones of the same type. In some cases, different geographic areas may relate to or correspond to one or more zones of different types. For example, in some cases, the UE may identify a serving zone corresponding to geographic coverage area 110-a, as well as geographic coverage areas 110-c and 110-e. These one or more serving zones may each correspond to a geographic area in which one or more base stations may be located, where the base stations are configured to serve or facilitate transmission with a UE, including CoMP transmissions. In some cases, one or more base stations may make one or more determinations or identifications regarding serving zones or serving zone information.

In addition, in some cases, the UE may identify an exclusive zone corresponding to geographic coverage area 110-b, as well as geographic coverage areas 110-d and 110-f. These one or more exclusive zones may each correspond to an area in which one or more base stations may be located, where the base stations are configured to serve or facilitate transmission with another UE (e.g., UE 115-c) and may cause interference with the first UE (e.g., UE 115-a) based on serving or facilitating transmission with the other UE.

For example, base station 105-g may be located within an exclusive zone relating to UE 115-a, as depicted in FIG. 2. UE 115-a may identify geographic coverage area 110-a corresponding to a serving zone and geographic coverage area 110-b corresponding to an exclusive zone based at least in part on an identified power associated with one or more requests sent by one or more base stations (e.g., base stations 105-b, 105-c, 105-e, and/or 105-g) via a reference signal (e.g., CSI-RS) or another method. As an example, a base station may determine a serving zone and an exclusive zone based on one or more received powers associated with channel measurement information, including comparing a first received power related to one or more devices or transmissions to a second received power related to one or more devices or transmissions. In some cases, one or more base stations may make one or more determinations or identifications regarding exclusive zones or exclusive zone information. In other cases, one or more base UEs may make one or more determinations or identifications regarding exclusive zones or exclusive zone information.

In some cases, a UE may transmit one or more identified zones to one or more base stations (e.g., base station 105-b), including, but not limited to, a base station (e.g., base station 105-b) serving the UE (e.g., UE 115-a). In other cases, the UE may transmit zone information, including related information or characteristics associated with a serving zone, an exclusive zone or another zone to one or more base stations (e.g., base station 105-b), including, but not limited to, a base station (e.g., base station 105-b) serving the UE (e.g., UE 115-a). In addition to or as part of the zone or the zone information, the UE may transmit technical information relating to one or more past or future transmissions (e.g., DL transmissions, UL transmissions). In some cases, this technical information may include, but is not limited to, CQI, PMI, related information, or other information.

Based at least in part on the received zone, zone information, or a combination thereof, one or more base stations (e.g., base station 105-g) may identify its location relative to one or more zones associated with one or more devices, such as a UE. For example, as depicted in FIG. 2 base station 105-g may identify that it is located within a zone associated with UE 115-a (e.g., an exclusive zone corresponding to geographic coverage area 110-b) and a zone associated with UE 115-c (e.g., a serving zone corresponding to geographic coverage area 110-e). In some cases, a base station may identify one or more zones associated with one or more UEs and determine its location relative to the one or more zones, the one or more UEs, or both.

A UE may identify its location relative to one or more zones associated with one or multiple UEs or may identify a base station's location relative to one or more zones associated with one or multiple UEs. This may be based on one or more transmissions received from or sent to one or more UEs, one or more base stations, or some combination thereof. For example, base station 105-g may identify that it is located within a zone associated with UE 115-a and a zone associated with UE 115-c based on transmissions from UE 115-a and UE 115-c. In some cases, this may be based on information received and compiled in an association table, among other methods, as discussed below.

Alternatively, base station 105-g may identify that it is located within a zone associated with UE 115-a and a zone associated with UE 115-c based on a single direct transmission from UE 115-c, which may include information associated with UE 115-c and UE 115-a based on information UE 115-c received from a separate transmission associated with UE 115-a. In other cases, base station 105-g may identify that it is located within a zone associated with UE 115-a and a zone associated with UE 115-c based on multiple direct transmissions from UE 115-a and UE 115-c. In other cases, base station 105-g may identify that it is located within a zone associated with UE 115-a and a zone associated with UE 115-c based on one or more transmissions from one or more UEs (e.g., UE 115-c) and one or more base stations (e.g., base station 105-c, 105-d).

In some examples, based at least in part on the identified zone, the zone information, or other information, base station 105-g may construct an association table of information, which may relate to one or more devices within the cell, the micro-cell, or the network. In some examples, the methods and techniques may be employed in multiple related networks, and may not be limited to only one network.

In some examples, a UE (e.g., UE 115-c, UE 115-a) may identify the one or more zones associated with itself, another UE, or a base station based on information determined or identified from its own operations or received transmissions and/or information received from one or more other devices. In some examples, a base station (e.g., base station 105-g) may distribute the identified zone, the zone information, other information, or some combination thereof with one or more other devices within a cell, between cells, within a micro-cell, between micro-cells, within a network, some combination thereof, or other areas.

In some examples, after one or more UEs, base stations, or some combination thereof identify one or more (e.g., zones corresponding to geographic coverage areas 110-a, 110-b, 110-c, 110-d, 110-e, 110-f), the information may be distributed and exchanged between different devices (e.g., within a network) so that at least some of the devices are notified about the respective zones, which may include serving zones, exclusive zones, or some combination thereof. The devices may facilitate CoMP transmissions and communications based on the zones, the associated information (e.g., association table information), or a network reuse pattern.

In some examples, the base stations may exchange zone information to facilitate identifying a network reuse pattern applying to multiple devices, which may be used for CoMP communications. This network reuse pattern may be used for current or future communications by facilitating resource reuse based on devices positioned within or relative to one or more zones and whether the one or more devices may inhibit or interfere with transmissions to one or more other devices, such as UEs.

With reference to FIG. 2, base station 105-g may be positioned with an exclusive zone (corresponding to geographic coverage area 110-b) such that CoMP transmissions from base stations in the respective serving zones to serve UE 115-a and UE 115-c may cause interference based on the location of base station 105-g. A resulting network reuse pattern may be based on information received from one or more UEs, information received from one or more base stations, or other information, including information communicated through a distributed message exchange where different devices may communicate with each other regarding zones, zone information, and other information. As discussed below, based on the network reuse pattern related to a message exchange, CoMP transmissions (among other types) to various devices such as UEs may be coordinated to limit transmission interference.

Figure 3:
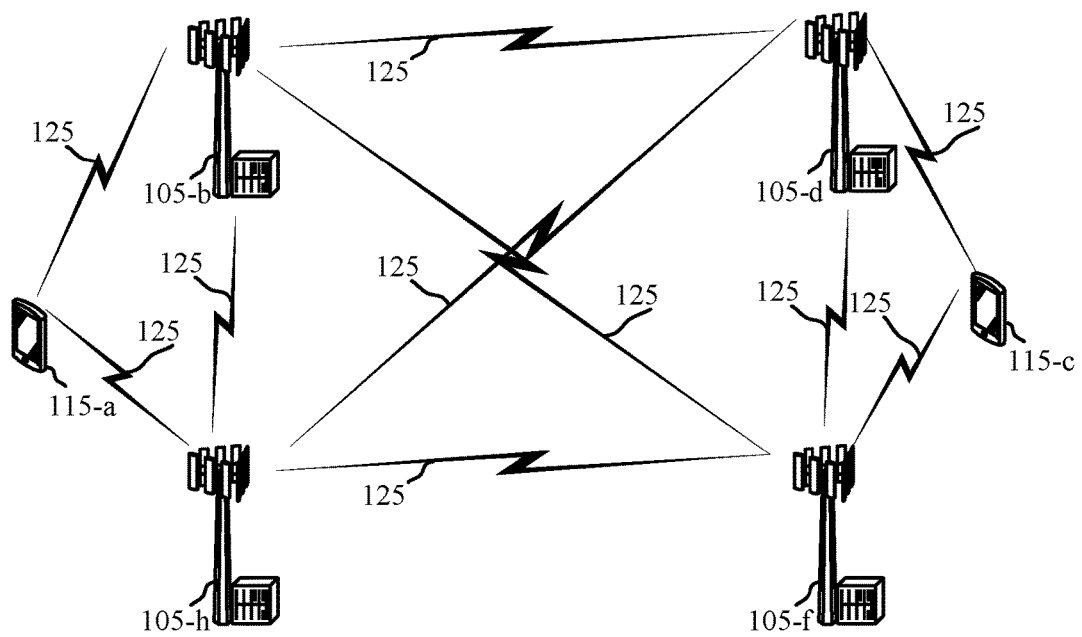
FIG. 3 illustrates an example of a system that supports reuse-pattern based co-ordinate multi-point transmission via distributed message exchange in accordance with aspects of the present disclosure.

FIG. 3 illustrates an example of a system 300 for reuse-pattern based co-ordinate multi-point transmission via distributed message exchange. In some cases, system 300 may represent aspects of techniques performed by a UE 115 or base station 105, 105-a as described with reference to FIG. 1.

In some examples, system 300 may be an example of a wireless communications system. For example, system 300 may utilize CoMP techniques and method to facilitate receiving and transmitting zone information, identifying a network reuse pattern for CoMP communication, and transmitting one or more CoMP transmissions.

In some examples, at least some of the base stations (e.g., base stations 105-d, 105-f, 105-h, 105-b) may be associated with one or more UEs, zones, or geographic areas, as described with reference to FIG. 2. In some examples, at least some of the base stations (e.g., base station 105-b) may receive an identified zone, zone information, other information, or some combination, from one or more UEs (e.g., UE 115-a). In some examples, at least some of the UEs (e.g., UE 115-a, UE 115-c) may be associated with multiple base stations for UL and DL transmissions.

As one example, based at least in part on the identified zone, zone information, and/or other information, base station 105-g may construct an association table of information to facilitate CoMP transmissions and identification of a network reuse pattern, which table may relate to one or more devices within the cell, the micro-cell, or the network. For example, each base station may receive information specifying a zone identified by a UE, zone information transmitted by a UE to a base station that allows the base station to identify one or more zones, or other information. Based at least in part on this information, a base station may compile and/or store the identified zone or zone information using a storage format. In some cases, the storage format may be, include, or be related to an association table that is stored locally at one or more devices (e.g., base stations) or remotely at one or more remote devices (e.g., remote storage devices, remote servers, databases).

As one example, the association table may include information relating to the storing device (e.g., a base station), another device (e.g., a UE) that is associated with a storage device (e.g., a UE being served by or within a predetermined distance from the storing device), and zone information. In some cases, this zone information may include, but is not limited to, one or more serving zones, one or more exclusive zones, zone information relating to a first zone type (e.g., serving zone), a second zone type (e.g., an exclusive zone), devices associated with one or more zones, other information, or some combination thereof.

As an example, an association table may be or include a DL association table. This DL association table may initially include information relating to only some devices within a network or subsection for the network, which may be considered an association table component (that may be distributed to other devices to populate a combined association table or a global association table based on any number of association table components). For example, with reference to FIG. 2, an association table component may include information regarding a UE, a serving zone, and an exclusive zone. Specifically, an association table component may include information regarding UE 115-*a*, that geographic coverage area 110-*a* corresponding to a serving zone includes base stations 105-*b* and 105-*c*, and that geographic coverage area 110-*b* corresponding to an exclusive zone includes 105-*g*. In some cases, this information may be transmitted to and/or stored within at least one of base stations 105-*b* and 105-*c*, among other devices.

After at least some devices within a network assemble or identify association table components, the association table components may be distributed or relayed via one or more distributed message exchange between various devices, as depicted in FIG. 3. This distribution or relay may facilitate population of a global association table having information related to multiple devices and zones, such as those within a network.

In some cases, one or more devices may perform the distributed message exchange. In some cases, one or more base stations, UEs, other devices, or some combination may perform the distributed message exchange. In some examples, the distributed message exchange may occur in predetermined order or pattern, or may be based on one or more algorithms, scheduling algorithms of various types, or protocols.

As one example, each device having an association table component may distribute its component to each other device within a group or a network to facilitate each device populating a combined association table or a global association table. Specifically, base station 105-*b* may participate in a distributed message exchange by distributing its association table component to base stations 105-*d*, 105-*f*, and 105-*h* via communication links 125. During this same time, another time, or an at least partially overlapping time, at least some or each of the other devices (e.g., base stations 105-*d*, 105-*f*, and 105-*h*) may also participate in a distributed message exchange by each distributing a respective association table component to each of the other devices via communication links 125.

As one example for the system 200 shown in FIG. 2, a global association table constructed based on a distributed message exchange may include the following:

| UE Information | Serving Zone Information | Exclusive Zone Information |
|---|---|---|
| UE 115-a | 105-b, 105-c | 105-g |
| UE 115-b | 105-d, 105-e | Not Applicable |
| UE 115-c | 105-f, 105-g | Not Applicable |

In other cases, other information may also be included in an association table, or information shown here may be omitted from the association table (e.g., it may be based on only one zone, such as an exclusive zone or a serving zone).

The distributed message exchange may occur using a dissemination algorithm, in a round-robin fashion, in a preassigned formation or order, in another predetermined order, or based on some combination. In some cases, each of the base stations (and/or other coordinating devices) may individually use the same algorithm, instruction, notification, data, or information relating to a predetermined order for coordinating the zone-related information, the association table, or information for implementing the CoMP transmissions. This algorithm, instruction, notification, data, or information may be conveyed before any distributed message exchange, as part of the distributed message exchange, after the distributed message exchange, or some combination thereof.

In some cases, the algorithm, instruction, notification, data, or knowledge may originate from one or more devices (e.g., base stations, UEs) due to one or more conditions or protocols. Alternatively, each device participating in the distributed message exchange may use a default algorithm, instruction, or notification. In some examples, the message exchange between two base stations may be conducted in a predetermined sequential order and may be performed using a local network (e.g., Ethernet), among other options.

In some cases, the associations and the transmissions may be determined or scheduled based on the identified network reuse pattern based on a distributed message exchange. In some cases, the message may be transmitted to other base stations having another base station (associated with a different UE) in one or more zones (e.g., serving zone, exclusive zone).

With reference to FIG. 3, in some examples, at least some of or each base station may distribute information to each other base station in the network in a distributed manner enabling propagation of association table components to each of the base stations. In some cases, this information may relate to one or more zones, zone information, or other information associated with the relationship between a UE, one or more base stations, and zones. In some cases, each of the base stations (and/or other coordinating devices) may individually use a different algorithm, instruction, notification, data, or information relating to a predetermined order for coordinating the zone-related information, the association table, or information for implementing the CoMP transmissions.

In some cases, some distribution transmissions may occur simultaneously, during overlapping intervals, or separately. As an example, base station 105-*b* may transmit a message to be distributed to base station 105-*f* at the same time or during an overlapping interval as base station 105-*d* transmits a message to be distributed to base station 105-*h*. In some examples, the same message or a different message containing additional information may be distributed to one or more other devices (e.g., base stations). For example, based on receiving a transmission from base station 105-*b*, base station 105-*f* may transmit the information it received from base station 105-*b* in addition to its own association table component to base station 105-*h*. Additionally or alternatively, base station 105-*f* may exchange its own association table component with base station 105-*b* to facilitate a distributed message exchange. These different transmissions from base station 105-*f* to other base stations may occur simultaneously, during overlapping intervals, serially, or some combination.

In some examples, a distributed message exchange may include communications between base stations and UEs or other devices. For example, a UE (e.g., UE 115-*a*) may facilitate a distributed message exchange between base stations by permitting a message exchange from a first base station (e.g., base station 105-*h*) to a second base station (e.g., base station 105-*b*) through a UE (e.g., UE 115-*a*), among other examples. Alternatively, a UE may transmit a zone, zone information, or other information to multiple base stations whether or not the base stations are configured to serve that UE.

As another example, the distributed message exchange may facilitate a progressive message exchange where each association table component is collected from various devices and the global updated association table is then redistributed to at least some of the devices in the network (e.g., to at least some of the base stations). As a result, in some cases, each device participating in the distributed message exchange may include or have access to the same association table information.

In other cases, some devices participating in the distributed message exchange may include at least some overlapping association table components or at least some but not all of the devices may include or have access to the same association table.

In some cases, a distributed message exchange provides a de-centralized method for identifying network reuse pattern information based on one or more identified zones associated with a first base station based on received channel measurement information. This de-centralized method provide advantages by enabling communication between the different devices even when one or more communication links may operate less than optimally based on interference, and allows for distribution of local zones or zone information to other devices in the same network. This de-centralized method also may not require that each base station within a network or a region is in communication with every other base station. In other examples, a de-centralized method may allow for communication and network reuse patterns and communications relating to local or lower-level base stations (e.g., a pico cell) without requiring higher-level or hierarchically-organized devices and structures that rely on more complex macro-level devices (e.g., a macro cell).

Once at least some or all of the devices (e.g., base stations, UEs, some combination) in the network have obtained a global association table, one or more operations may be performed. In some examples, these operations may include each device performing one or more algorithms to determine CoMP transmission functions based at least in part on the global association table. In some examples, the one or more operations may be performed independent of any centralized control by a base station or other device. Instead, the one or more operations may be performed by the devices (e.g., base stations) independently or through non-centralized communication.

For example, based on each base station receiving the global association table, each base station may execute a same or a similar algorithm to identify a reuse pattern to facilitate CoMP transmissions that facilitate communication of the critical information while diminishing interference from simultaneous CoMP transmissions related to multiple UEs. For example, each base station may execute an algorithm or other scheduling decision to permit one or more communications to a predetermined device (e.g., a UE such as UE 115-*a* or UE 115-*b*) before a second predetermined device (e.g., UE 115-*c*). In some cases, identifying the network reuse pattern may be based on a message exchange between multiple base stations in a distributed fashion, as described with reference to FIGS. 2 and 3.

In some examples, one or more base stations may identify a network reuse pattern. This network reuse pattern may include establishing a base station's association with one or more UEs based on the association table information, and may include identifying what action should be performed, a time of the actions, a relationship of some action with another action, which devices should be coordinated or perform the actions or related operations, other operations or actions, or some combination. In some examples, a network reuse pattern may include a pattern designed to facilitate current communications, including, but not limited to, CoMP communications. In other examples, a network reuse pattern may include a pattern designed to facilitate future communications, including, but not limited to, CoMP communications that facilitate reuse of various resources for upcoming transmissions. Then, the one or more base stations may schedule one or more transmissions based on the network reuse pattern.

For example, based on the association table, one or more devices in the network may determine when to communicate using one or more CoMP transmissions related to some devices, such as UE 115-*a* and UE 115-*c*, including determining that these UEs should not each be served with multiple transmission paths or points using CoMP transmissions simultaneously or in overlapping intervals—thus avoiding interference that would otherwise be caused by base station 105-*g* based on a CoMP transmission to UE 115-*a* and a CoMP transmission to UE 115-*c*, as described with reference to FIG. 2.

In some cases, forming this association table and disseminating the information via a distributed message exchange may inform devices (e.g., base stations, UEs) about whether CoMP transmissions to different devices may proceed without interference and dictate how resources are used. For example, as depicted in FIG. 2, UE 115-*b* may be served via CoMP transmissions associated with base stations 105-*d* and 105-*e* without affecting other UEs or base stations because these other devices are not found within and are not associated with a serving zone associated with geographic coverage area 110-*c* or an exclusive zone associated with geographic coverage area 110-*d*.

In some examples, a base station may individually establish its association with one or more UEs. In some cases, the base station may schedule one or more transmissions based on the identified network reuse pattern that is related to the established association(s). In some examples, the identified network reuse pattern may be based on time and frequency resource reuse and enable channel reuse based on these different resources. In other examples, the reuse may including time resource reuse frequency resource reuse, and any channel reuse may be based on the reuse pattern.

In some examples, based on the network reuse pattern or related information, a first UE (e.g., UE 115-*a*) may be served via one or more CoMP transmissions during a first interval and a second UE (e.g., UE 115-*c*) may be served via one or more CoMP transmissions during a second interval different from the first interval based at least in part on the network reuse pattern. In some cases, the two intervals may not be simultaneous. In some cases, the two intervals may be sequential. In some cases, the two intervals may be non-overlapping. For example, based on a distributed message exchange and with reference to FIG. 2, UE 115-*c* may not be served via a CoMP transmission during the same time that UE 115-*a* is served via a CoMP transmission. Thus, a network reuse pattern may facilitate time divided CoMP transmissions to various UEs based on the received association table or related information.

Specifically, base station 105-g may not serve UE 115-c via a CoMP transmission or transmissions while base stations 105-c and 105-b serve UE 115-a via a CoMP transmission or transmissions. The network reuse pattern and divided CoMP transmission operation may avoid the self-defeating interference that may otherwise occur based on multiple CoMP transmissions to UE 115-a and UE 115-c. This also allows the divided CoMP transmissions that are otherwise designed to facilitate the transmission of critical information effectively to do so—without causing severe interference and preventing or at least hindering the transmission of the critical or more important information.

In some cases, each of the CoMP transmissions may be of the same type (e.g., joint processing), while in other cases some of the CoMP transmissions may be of a first type (e.g., joint processing) and others may be of a second type (e.g., CS/CB). In some examples, using the network reuse pattern to coordinate and identify transmission of multiple multi-point transmissions may increase the reliability of each of these transmissions and avoid interference in multi-point transmission environments and applications (as opposed to solely increasing throughput).

In other examples, based on this information, a first UE (e.g., UE 115-a) may be served via one or more CoMP transmissions during a first interval and a second UE (e.g., UE 115-c) may be served via one or more non-CoMP transmissions during a second interval based at least in part on the network reuse pattern. In some cases, the two intervals may be simultaneous. In some cases, the two intervals may be at least partially overlapping. In some cases, a first UE (e.g., UE 115-a) may be served via CoMP transmission during a first interval by two or more base stations (e.g., base stations 105-b and 105-c) and a second UE (e.g., UE 115-c) may be served via a single point transmission or a single path transmission (e.g., by base station 105-f) during a second interval. As highlighted here, the second UE may be served via a single point or a single path transmission for at least part of the second interval by the non-interfering device (e.g., base station 105-f), instead of the interfering device (e.g., base station 105-g) that may diminish the reliability of the transmissions.

In some examples of the methods and techniques in this disclosure, no joint precoding is required between different devices, such as base stations. The methods and techniques used may performed independent of any joint precoding between the devices—if any is performed. Performing operations independent of joint precoding information avoids unnecessary precoding communications and coordination, and the requirement for other detailed channel information (e.g., PMI, rank indicator) beforehand. Instead, in some cases, communication and operations performed relating to base stations, among other devices, is only based on considering on or off states of one or more devices (e.g., base stations).

Based at least in part on an association table at one or more devices, when packets are received for designated UEs, certain devices may implement communications based on the association table. For example, when DL packets designated for UE 115-a and UE 115-c are received in the buffer or the queue, one or more base stations may coordinate to facilitate transmission of each packet while also reducing or minimizing interference based on the network reuse pattern and related zones or zone information.

For example, base stations 105-b and 105-c may serve UE 115-a and base stations 105-f and 105-g may serve UE 115-c based on time division operations that are separated to decrease interference from multiple CoMP transmission occurring during overlapping or simultaneous intervals. This may allow base stations 105-b and 105-c to serve UE 115-a before or after base stations 105-f and 105-g serve UE 115-c—preventing interference from base station 105-g that would otherwise adversely affect base stations 105-b and 105-c that serve UE 115-a.

Figure 4:
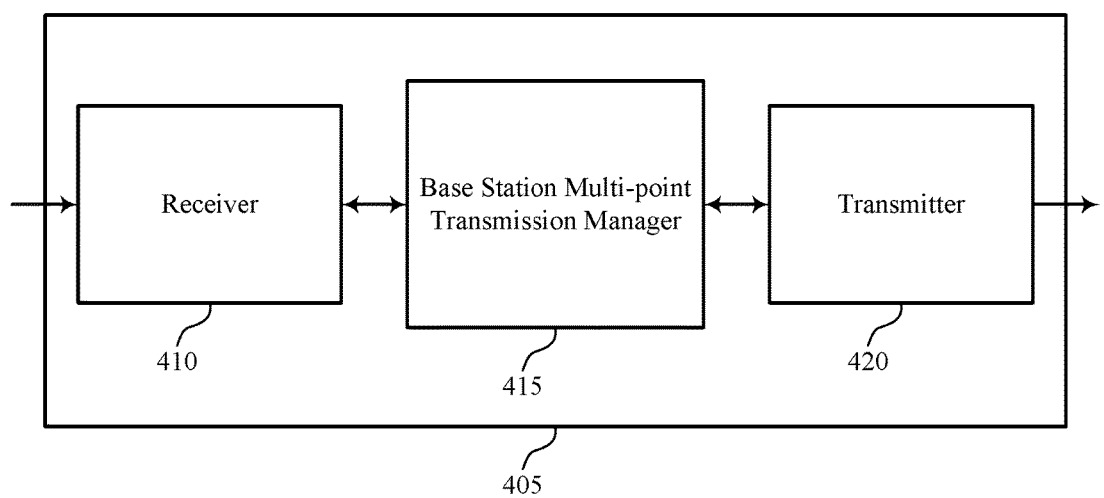
FIGS. 4 through 6 show block diagrams of a device that supports reuse-pattern based co-ordinate multi-point transmission via distributed message exchange in accordance with aspects of the present disclosure.

FIG. 4 shows a block diagram 400 of a wireless device 405 that supports reuse-pattern based co-ordinate multi-point transmission via distributed message exchange in accordance with various aspects of the present disclosure. Wireless device 405 may be an example of aspects of a base station 105, 105-a as described with reference to FIG. 1. Wireless device 405 may include receiver 410, base station multi-point transmission manager 415, and transmitter 420. Wireless device 405 may also include a processor. Each of these components may be in communication with one another (e.g., via one or more buses).

Receiver 410 may receive information such as packets, user data, or control information associated with various information channels (e.g., control channels, data channels, and information related to reuse-pattern based co-ordinate multi-point transmission via distributed message exchange). Information may be passed on to other components of the device. The receiver 410 may be an example of aspects of the transceiver 735 described with reference to FIG. 7.

Base station multi-point transmission manager 415 may be an example of aspects of the base station multi-point transmission manager 715 described with reference to FIG. 7.

Base station multi-point transmission manager 415 may receive, at a first base station, channel measurement information from a first UE, and identify a zone associated with the first base station based on the received channel measurement information. Base station multi-point transmission manager 415 may also receive, from a second base station, zone information associated with one or more UEs that transmitted channel measurement information to the second base station, identify a network reuse pattern for coordinated multi-point (CoMP) communication based on the identified zone and the received zone information, and transmit a multi-point transmission to a second UE based on the identified network reuse pattern.

Transmitter 420 may transmit signals generated by other components of the device. In some examples, the transmitter 420 may be collocated with a receiver 410 in a transceiver module. For example, the transmitter 420 may be an example of aspects of the transceiver 735 described with reference to FIG. 7. The transmitter 420 may include a single antenna, or it may include a set of antennas.

Figure 5:
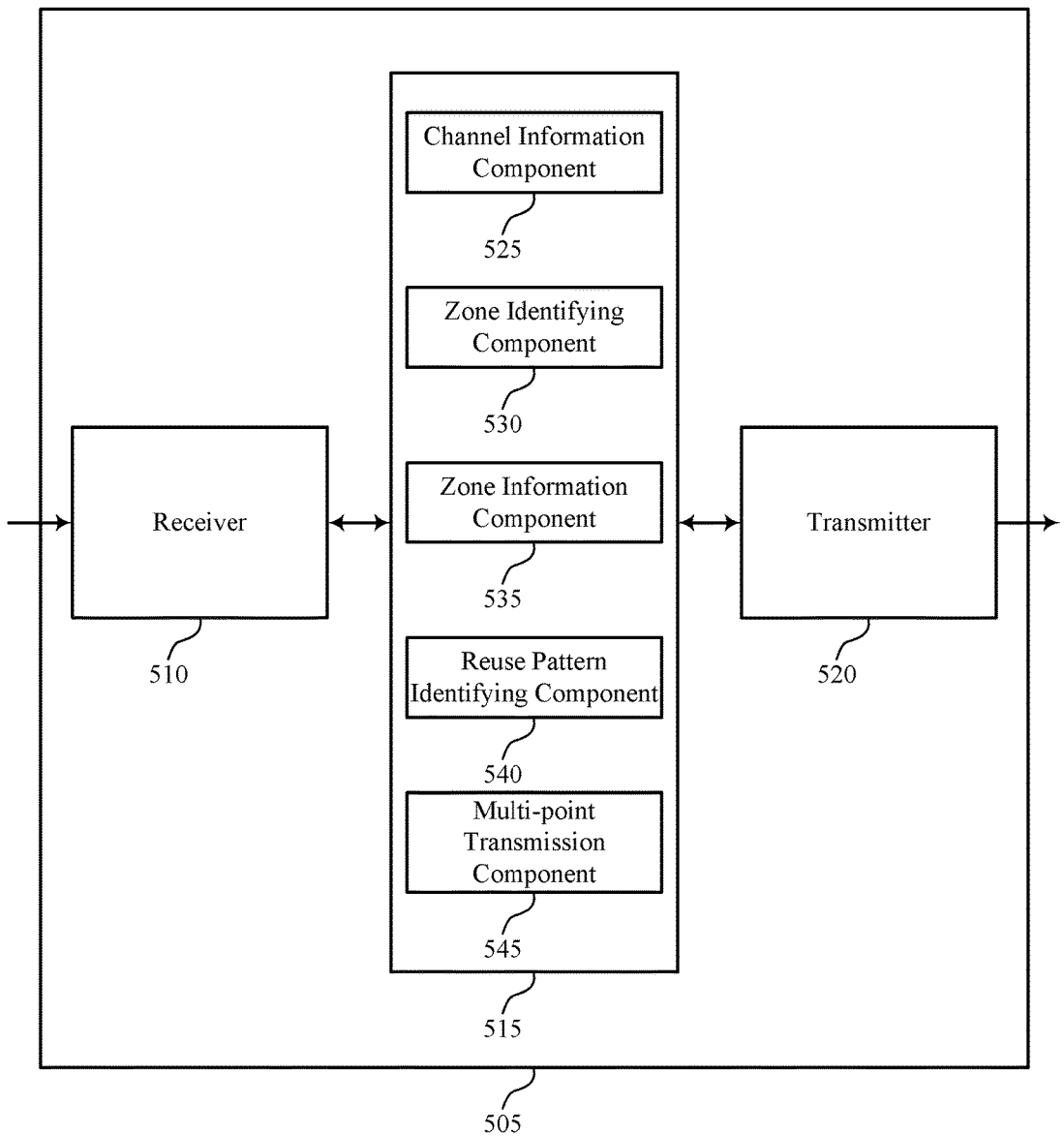

FIG. 5 shows a block diagram 500 of a wireless device 505 that supports reuse-pattern based co-ordinate multi-point transmission via distributed message exchange in accordance with various aspects of the present disclosure. Wireless device 505 may be an example of aspects of a wireless device 405 or a base station 105, 105-a as described with reference to FIGS. 1 and 4. Wireless device 505 may include receiver 510, base station multi-point transmission manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to reuse-pattern based co-ordinate multi-point transmission via distributed message exchange). Information may be passed on to other components of the device. The receiver 510 may be an example of aspects of the transceiver 735 described with reference to FIG. 7.

Base station multi-point transmission manager 515 may be an example of aspects of the base station multi-point transmission manager 715 described with reference to FIG. 7.

Base station multi-point transmission manager 515 may also include channel information component 525, zone identifying component 530, zone information component 535, reuse pattern identifying component 540, and multi-point transmission component 545.

Channel information component 525 may receive, at a first base station, channel measurement information from a first UE and compare a received power of the channel measurement information with a threshold. In some cases, the channel measurement information includes a channel quality indicator, or a precoding matrix indicator, or a combination thereof. In some cases, receiving the channel measurement information includes receiving a reference signal from the first UE.

Zone identifying component 530 may identify a zone associated with the first base station based on the received channel measurement information, identify a zone associated with the second base station based on the received zone information, and identify the zone associated with the second base station based on the comparing. In some cases, the identified zone includes an exclusive zone, or a serving zone, or a combination thereof. In some cases, the identified zone is based on a location of the first base station or the first UE.

Zone information component 535 may receive, from a second base station, zone information associated with one or more UEs that transmitted channel measurement information to the second base station and receive the zone information from the second base station is independent of joint precoding information.

Reuse pattern identifying component 540 may identify a network reuse pattern for CoMP communication based on the identified zone and the received zone information and transmit a single path transmission to a third UE based on the identified network reuse pattern or transmit a multi-point transmission to the first UE based on the identified network reuse pattern.

Multi-point transmission component 545 may transmit a multi-point transmission to a second UE based on the identified network reuse pattern.

Transmitter 520 may transmit signals generated by other components of the device. In some examples, the transmitter 520 may be collocated with a receiver 510 in a transceiver module. For example, the transmitter 520 may be an example of aspects of the transceiver 735 described with reference to FIG. 7. The transmitter 520 may include a single antenna, or it may include a set of antennas.

Figure 6:
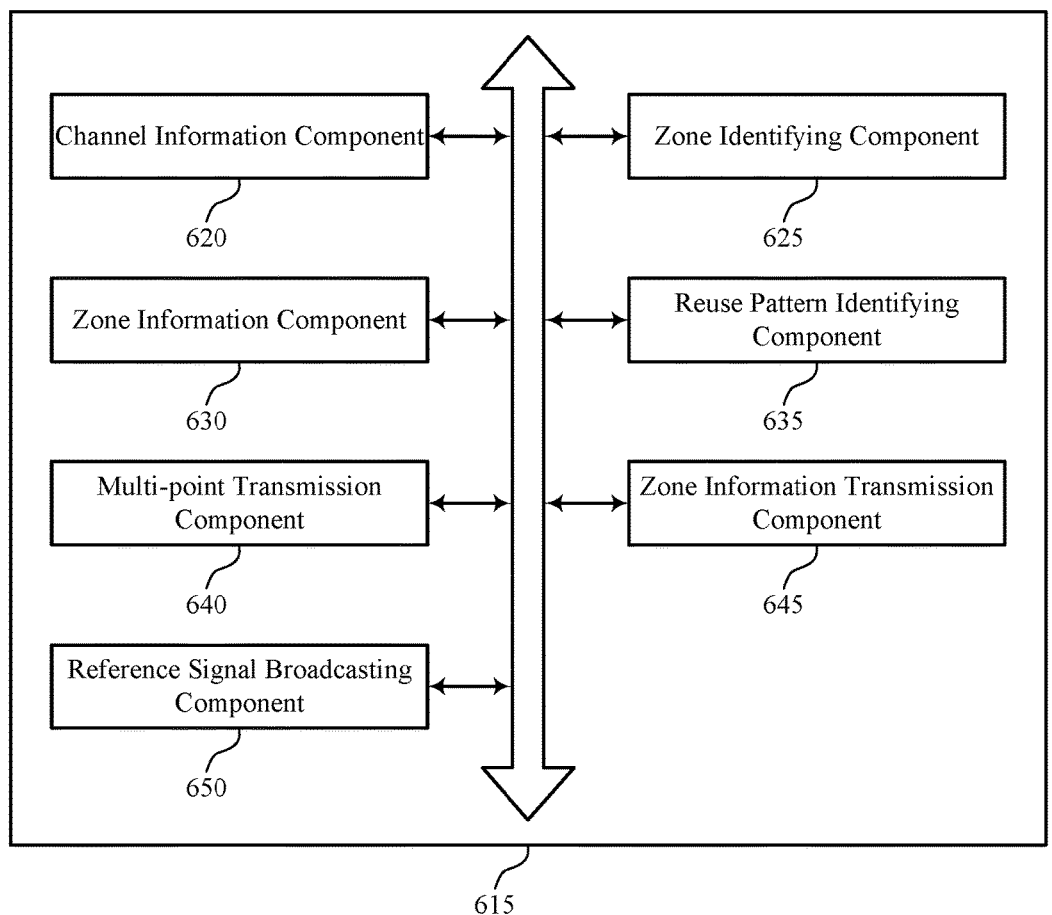

FIG. 6 shows a block diagram 600 of a base station multi-point transmission manager 615 that supports reuse-pattern based co-ordinate multi-point transmission via distributed message exchange in accordance with various aspects of the present disclosure. The base station multi-point transmission manager 615 may be an example of aspects of a base station multi-point transmission manager 415, a base station multi-point transmission manager 515, or a base station multi-point transmission manager 715 described with reference to FIGS. 4, 5, and 7. The base station multi-point transmission manager 615 may include channel information component 620, zone identifying component 625, zone information component 630, reuse pattern identifying component 635, multi-point transmission component 640, zone information transmission component 645, and reference signal broadcasting component 650. Each of these modules may communicate, directly or indirectly, with one another (e.g., via one or more buses).

Channel information component 620 may receive, at a first base station, channel measurement information from a first UE and compare a received power of the channel measurement information with a threshold. In some cases, the channel measurement information includes a channel quality indicator, or a precoding matrix indicator, or a combination thereof. In some cases, receiving the channel measurement information includes receiving a reference signal from the first UE.

Zone identifying component 625 may identify a zone associated with the first base station based on the received channel measurement information, identify a zone associated with the second base station based on the received zone information, and identify the zone associated with the second base station based on the comparing. In some cases, the identified zone includes an exclusive zone, or a serving zone, or a combination thereof. In some cases, the identified zone is based on a location of the first base station or the first UE.

Zone information component 630 may receive, from a second base station, zone information associated with one or more UEs that transmitted channel measurement information to the second base station and receive the zone information from the second base station is independent of joint precoding information.

Reuse pattern identifying component 635 may identify a network reuse pattern for CoMP communication based on the identified zone and the received zone information and transmit a multi-point transmission to the first UE based on the identified network reuse pattern. Reuse pattern identifying component 635 may identify a network reuse pattern for CoMP communication based on the identified zone and the received zone information and transmit a single path transmission to a third UE based on the identified network reuse pattern.

Multi-point transmission component 640 may transmit a multi-point transmission to a second UE based on the identified network reuse pattern.

Zone information transmission component 645 may transmit zone information based on the identified zone to a third base station and transmit zone information based on the identified zone to a set of base stations within a network via a distributed message.

Reference signal broadcasting component 650 may broadcast a reference signal to the first UE, where the channel measurement information is received in response to the broadcasting.

Figure 7:
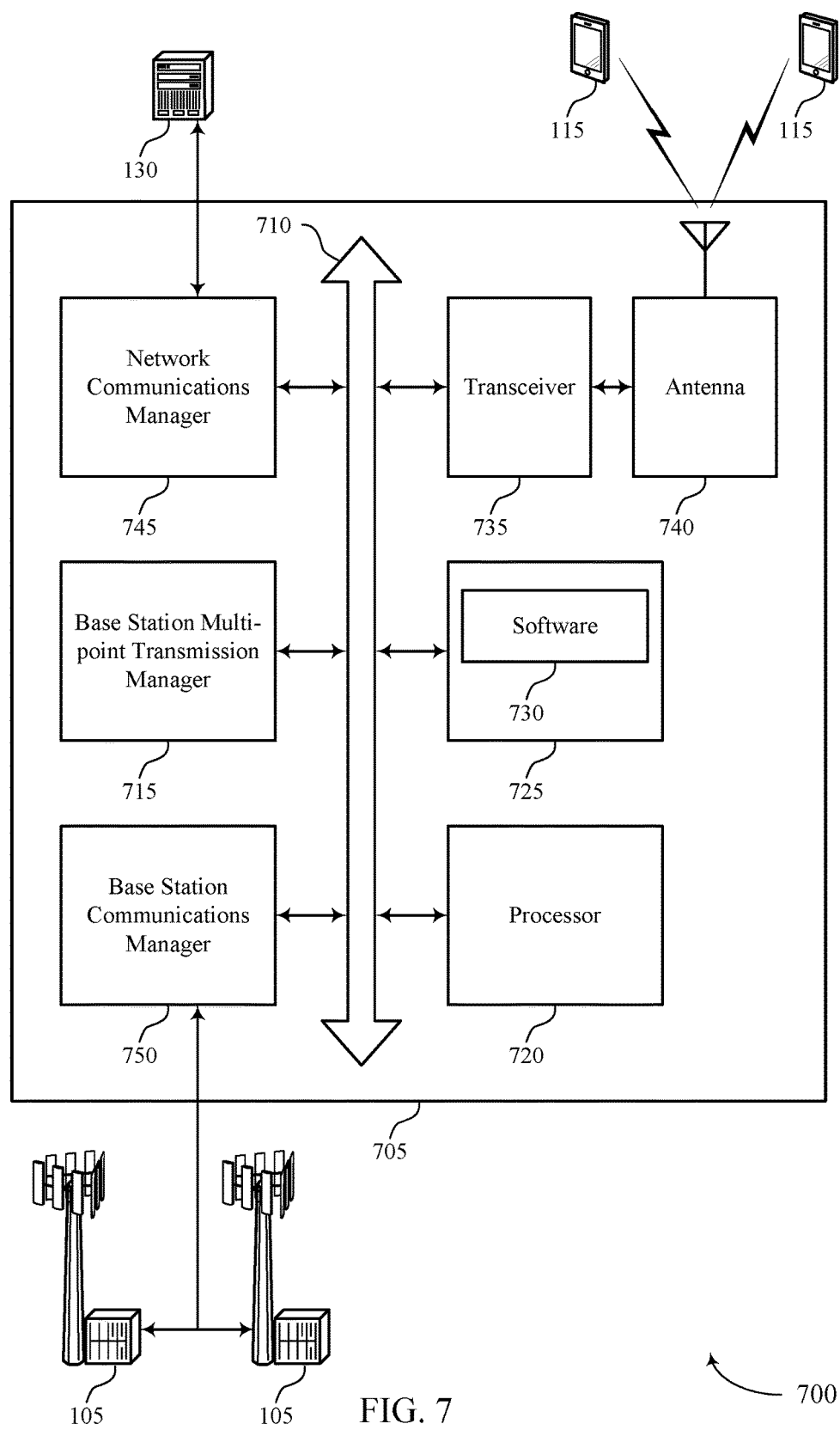
FIG. 7 illustrates a block diagram of a system including a base station that supports reuse-pattern based co-ordinate multi-point transmission via distributed message exchange in accordance with aspects of the present disclosure.

FIG. 7 shows a diagram of a system 700 including a device 705 that supports reuse-pattern based co-ordinate multi-point transmission via distributed message exchange in accordance with various aspects of the present disclosure. Device 705 may be an example of or include the components of wireless device 405, wireless device 505, or a base station 105, 105-*a* as described above, e.g., with reference to FIGS. 1, 4 and 5.

Device 705 may include components for bi-directional voice and data communications including components for transmitting and receiving communications, including base station multi-point transmission manager 715, processor 720, memory 725, software 730, transceiver 735, antenna 740, network communications manager 745, and base station communications manager 750.

Processor 720 may include an intelligent hardware device, (e.g., a general-purpose processor, a digital signal processor (DSP), a central processing unit (CPU), a microcontroller, an application specific integrated circuit (ASIC), a field-programmable gate array (FPGA), a programmable logic device, a discrete gate or transistor logic component, a discrete hardware component, or any combination thereof). In some cases, processor 720 may be configured to operate a memory array using a memory controller. In other cases, a memory controller may be integrated into processor 720. Processor 720 may be configured to execute computer-readable instructions stored in a memory to perform various functions (e.g., function or tasks supporting reuse-pattern based co-ordinate multi-point transmission via distributed message exchange).720.

Memory 725 may include random access memory (RAM) and read only memory (ROM). The memory 725 may store computer-readable, computer-executable software 730 including instructions that, when executed, cause the processor to perform various functions described herein. In some cases, the memory 725 can contain, among other things, a Basic Input-Output system (BIOS) which may control basic hardware and/or software operation such as the interaction with peripheral components or devices.

Software 730 may include code to implement aspects of the present disclosure, including code to support reuse-pattern based co-ordinate multi-point transmission via distributed message exchange. Software 730 can be stored in a non-transitory computer-readable medium such as system memory or other memory. In some cases, the software 730 may not be directly executable by the processor but may cause a computer (e.g., when compiled and executed) to perform functions described herein.

Transceiver 735 may communicate bi-directionally, via one or more antennas, wired, or wireless links as described above. For example, the transceiver 735 may represent a wireless transceiver and may communicate bi-directionally with another wireless transceiver. The transceiver 735 may also include a modem to modulate the packets and provide the modulated packets to the antennas for transmission, and to demodulate packets received from the antennas.

In some cases, the wireless device may include a single antenna 740. However, in some cases the device may have more than one antenna 740, which may be capable of concurrently transmitting or receiving multiple wireless transmissions.

Network communications manager 745 may manage communications with the core network (e.g., via one or more wired backhaul links). For example, the network communications manager 745 may manage the transfer of data communications for client devices, such as one or more UEs 115.

Base station communications manager 750 may manage communications with other base station 105, 105-a, and may include a controller or scheduler for controlling communications with UEs 115 in cooperation with other base stations 105, 105-a. For example, the base station communications manager 750 may coordinate scheduling for transmissions to UEs 115 for various interference mitigation techniques such as beamforming or joint transmission. In some examples, base station communications manager 750 may provide an X2 interface within an LTE/LTE-A wireless communications network technology to provide communication between base stations 105, 105-a.

Figure 8:
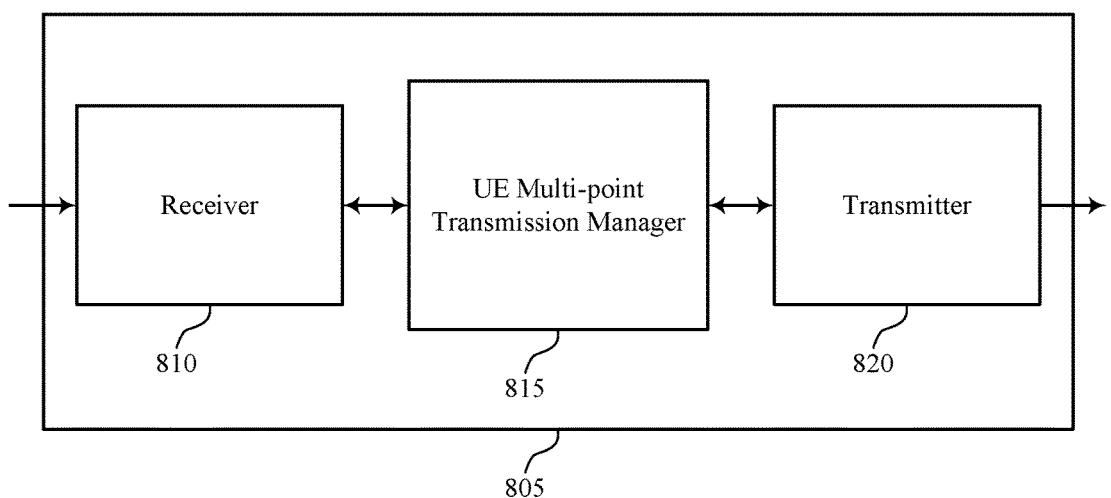
FIGS. 8 through 10 show block diagrams of a device that supports reuse-pattern based co-ordinate multi-point transmission via distributed message exchange in accordance with aspects of the present disclosure.

FIG. 8 shows a block diagram 800 of a wireless device 805 that supports reuse-pattern based co-ordinate multi-point transmission via distributed message exchange in accordance with various aspects of the present disclosure. Wireless device 805 may be an example of aspects of a UE 115 as described with reference to FIG. 1. Wireless device 805 may include receiver 810, UE multi-point transmission manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to reuse-pattern based co-ordinate multi-point transmission via distributed message exchange). Information may be passed on to other components of the device. The receiver 810 may be an example of aspects of the transceiver 1135 described with reference to FIG. 11.

UE multi-point transmission manager 815 may be an example of aspects of the UE multi-point transmission manager 1115 described with reference to FIG. 11. UE multi-point transmission manager 815 may transmit zone information to a base station in a CoMP association and receive a multi-point transmission based on an identified zone related to the CoMP association and the transmitted zone information.

Transmitter 820 may transmit signals generated by other components of the device. In some examples, the transmitter 820 may be collocated with a receiver 810 in a transceiver module. For example, the transmitter 820 may be an example of aspects of the transceiver 1135 described with reference to FIG. 11. The transmitter 820 may include a single antenna, or it may include a set of antennas.

Figure 9:
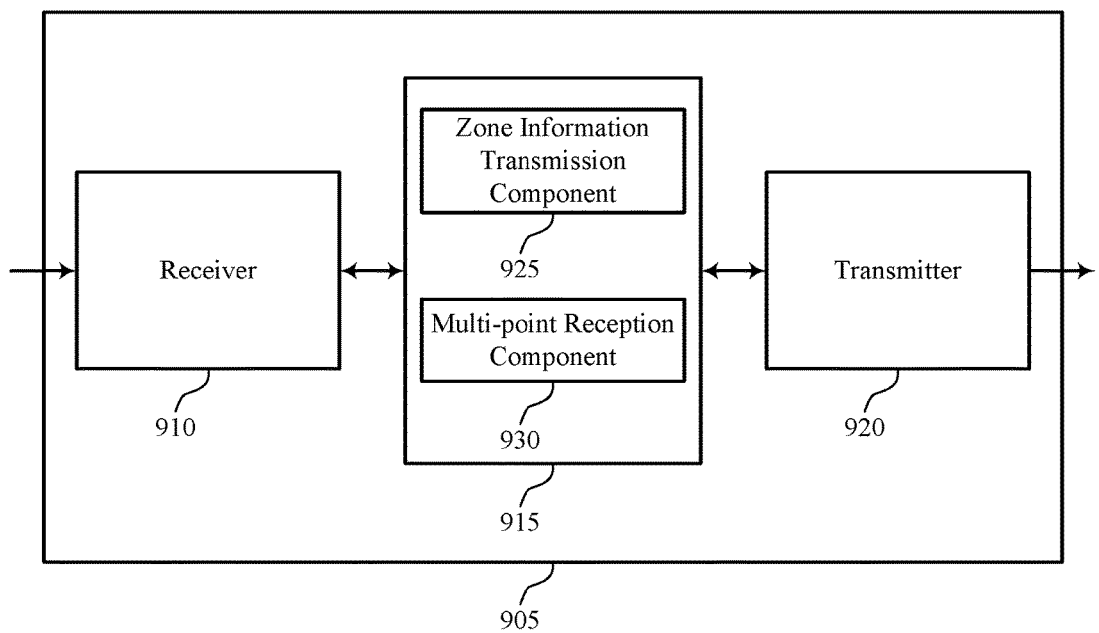

FIG. 9 shows a block diagram 900 of a wireless device 905 that supports reuse-pattern based co-ordinate multi-point transmission via distributed message exchange in accordance with various aspects of the present disclosure. Wireless device 905 may be an example of aspects of a wireless device 805 or a UE 115 as described with reference to FIGS. 1 and 8. Wireless device 905 may include receiver 910, UE multi-point transmission manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to reuse-pattern based co-ordinate multi-point transmission via distributed message exchange). Information may be passed on to other components of the device. The receiver 910 may be an example of aspects of the transceiver 1135 described with reference to FIG. 11.

UE multi-point transmission manager 915 may be an example of aspects of the UE multi-point transmission manager 1115 described with reference to FIG. 11. UE multi-point transmission manager 915 may also include zone information transmission component 925 and multi-point reception component 930. Zone information transmission component 925 may transmit zone information to a base station in a CoMP association. Multi-point reception component 930 may receive a multi-point transmission based on an identified zone related to the CoMP association and the transmitted zone information.

Transmitter 920 may transmit signals generated by other components of the device. In some examples, the transmitter 920 may be collocated with a receiver 910 in a transceiver module. For example, the transmitter 920 may be an example of aspects of the transceiver 1135 described with reference to FIG. 11. The transmitter 920 may include a single antenna, or it may include a set of antennas.

Figure 10:
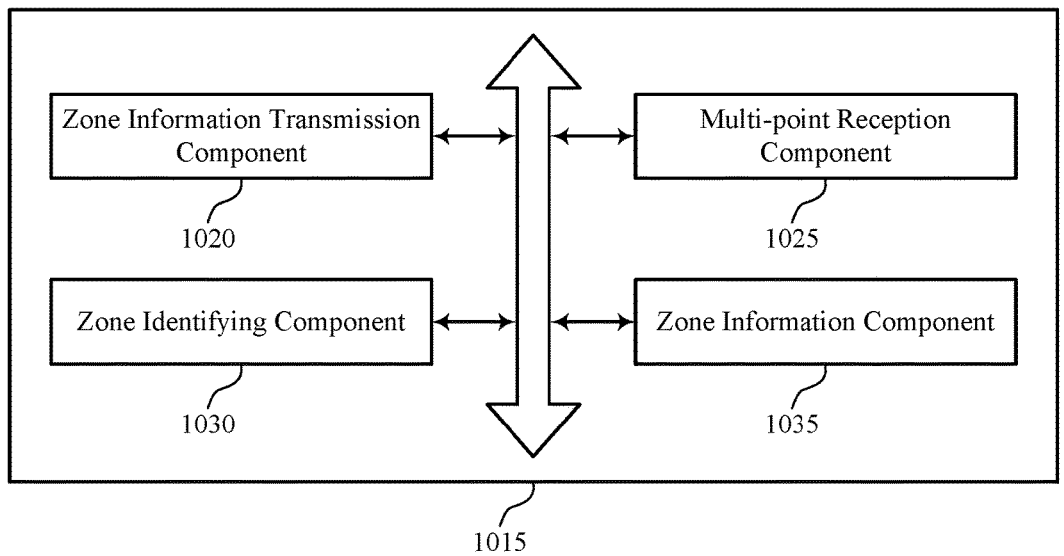

FIG. 10 shows a block diagram 1000 of a UE multi-point transmission manager 1015 that supports reuse-pattern based co-ordinate multi-point transmission via distributed message exchange in accordance with various aspects of the present disclosure. The UE multi-point transmission manager 1015 may be an example of aspects of a UE multi-point transmission manager 1115 described with reference to FIGS. 8, 9, and 11. The UE multi-point transmission manager 1015 may include zone information transmission component 1020, multi-point reception component 1025, zone identifying component 1030, and zone information component 1035. Each of these modules may communicate, directly or indirectly, with one another (e.g., via one or more buses).

Zone information transmission component 1020 may transmit zone information to a base station in a coordinated multi-point CoMP association. Zone information transmission component 1020 may also transmit a reference signal to a base station in a coordinated multi-point CoMP association. Multi-point reception component 1025 may receive a multi-point transmission based on an identified zone related to the CoMP association and the transmitted zone information. Zone identifying component 1030 may identify a zone related to the CoMP association, where the transmitted zone information is based on the identified zone. Zone identifying component 1030 may receive a response to a reference signal (e.g., a SRS) and identify a zone related to the CoMP association based on the received response to the reference signal.

Zone information component 1035 may process or determine zone information. In some cases, the zone information includes a reference signal transmitted on a dedicated channel to the base station. In some cases, the zone information includes a response to a reference signal received from the base station.

Figure 11:
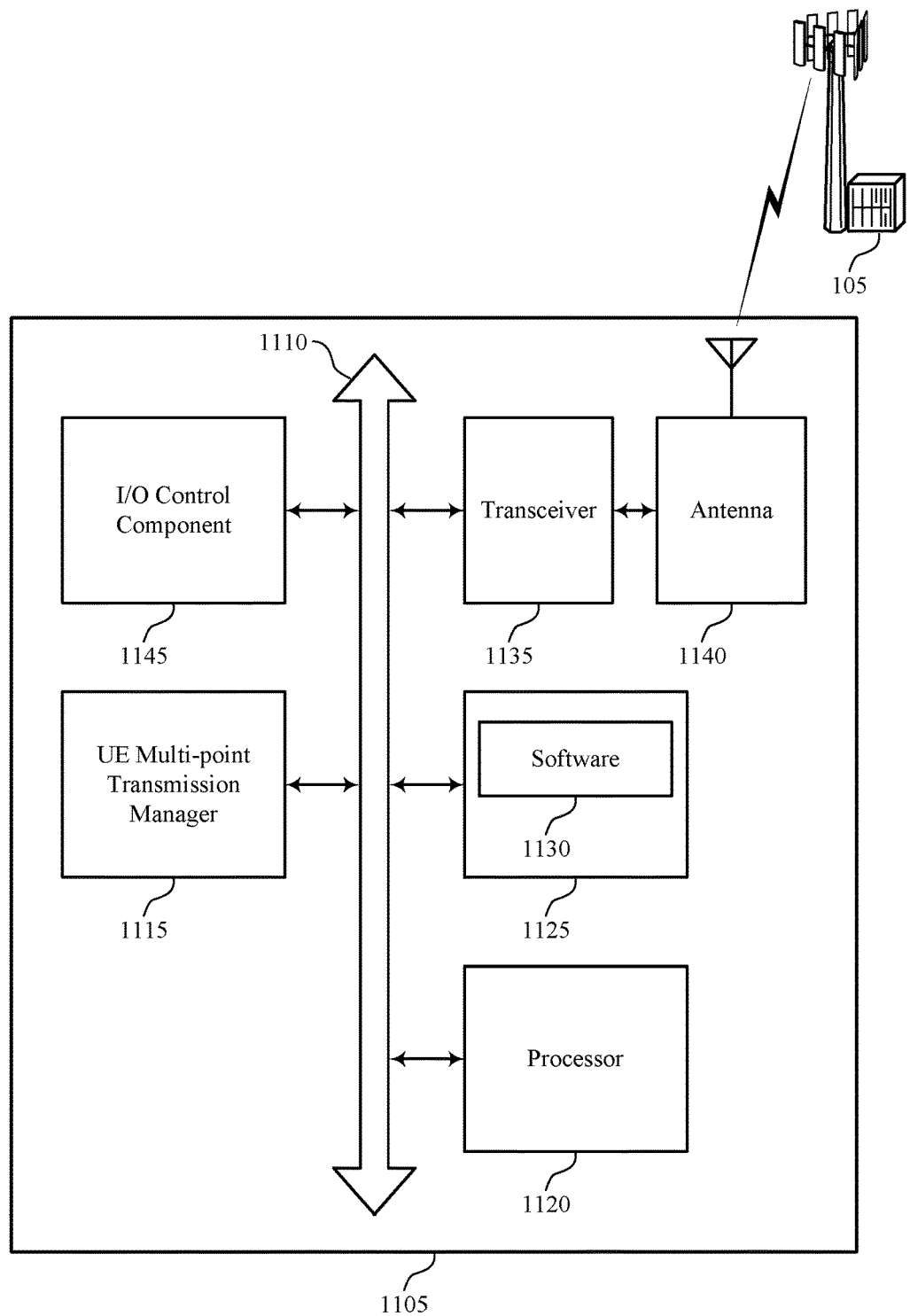
FIG. 11 illustrates a block diagram of a system including a UE that supports reuse-pattern based co-ordinate multi-point transmission via distributed message exchange in accordance with aspects of the present disclosure.

FIG. 11 shows a diagram of a system 1100 including a device 1105 that supports reuse-pattern based co-ordinate multi-point transmission via distributed message exchange in accordance with various aspects of the present disclosure. Device 1105 may be an example of or include the components of a UE 115 as described above, e.g., with reference to FIG. 1.

Device 1105 may include components for bi-directional voice and data communications including components for transmitting and receiving communications, including UE multi-point transmission manager 1115, processor 1120, memory 1125, software 1130, transceiver 1135, antenna 1140, and I/O control component 1145.

Processor 1120 may include an intelligent hardware device, (e.g., a general-purpose processor, a digital signal processor (DSP), a central processing unit (CPU), a microcontroller, an application specific integrated circuit (ASIC), a field-programmable gate array (FPGA), a programmable logic device, a discrete gate or transistor logic component, a discrete hardware component, or any combination thereof). In some cases, processor 1120 may be configured to operate a memory array using a memory controller. In other cases, a memory controller may be integrated into processor 1120. Processor 1120 may be configured to execute computer-readable instructions stored in a memory to perform various functions (e.g., function or tasks supporting reuse-pattern based co-ordinate multi-point transmission via distributed message exchange).1120.

Memory 1125 may include random access memory (RAM) and read only memory (ROM). The memory 1125 may store computer-readable, computer-executable software 1130 including instructions that, when executed, cause the processor to perform various functions described herein. In some cases, the memory 1125 can contain, among other things, a Basic Input-Output system (BIOS) which may control basic hardware and/or software operation such as the interaction with peripheral components or devices.

Software 1130 may include code to implement aspects of the present disclosure, including code to support reuse-pattern based co-ordinate multi-point transmission via distributed message exchange. Software 1130 can be stored in a non-transitory computer-readable medium such as system memory or other memory. In some cases, the software 1130 may not be directly executable by the processor but may cause a computer (e.g., when compiled and executed) to perform functions described herein.

Transceiver 1135 may communicate bi-directionally, via one or more antennas, wired, or wireless links as described above. For example, the transceiver 1135 may represent a wireless transceiver and may communicate bi-directionally with another wireless transceiver. The transceiver 1135 may also include a modem to modulate the packets and provide the modulated packets to the antennas for transmission, and to demodulate packets received from the antennas.

In some cases, the wireless device may include a single antenna 1140. However, in some cases the device may have more than one antenna 1140, which may be capable of concurrently transmitting or receiving multiple wireless transmissions.

I/O control component 1145 may manage input and output signals for device 1105. Input/output control component 1145 may also manage peripherals not integrated into device 1105. In some cases, input/output control component 1145 may represent a physical connection or port to an external peripheral. In some cases, I/O control component 1145 may utilize an operating system such as iOS®, ANDROID®, MS-DOS®, MS-WINDOWS®, OS/2®, UNIX®, LINUX®, or another known operating system.

Figure 12:
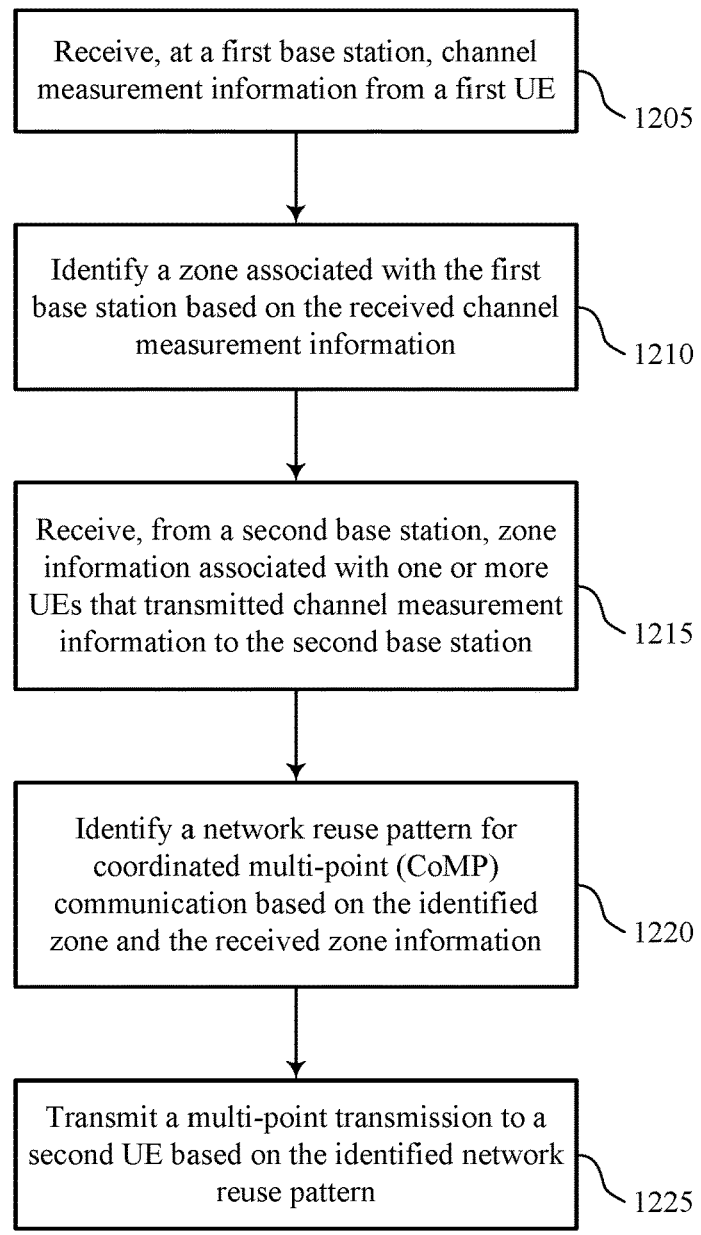
FIGS. 12 through 16 illustrate methods for reuse-pattern based co-ordinate multi-point transmission via distributed message exchange in accordance with aspects of the present disclosure.

FIG. 12 shows a flowchart illustrating a method 1200 for reuse-pattern based co-ordinate multi-point transmission via distributed message exchange in accordance with various aspects of the present disclosure. The operations of method 1200 may be implemented by a base station 105, 105-*a* or its components as described herein. For example, the operations of method 1200 may be performed by a base station multi-point transmission manager 415, 515, 615, or 715 as described with reference to FIGS. 4 through 7. In some examples, a base station 105, 105-*a* may execute a set of codes to control the functional elements of the device to perform the functions described below. Additionally or alternatively, the base station 105, 105-*a* may perform aspects of the functions described below using special-purpose hardware.

At block 1205, the base station 105, 105-*a* may receive channel measurement information from a first UE. The operations of block 1205 may be performed according to the methods described with reference to FIGS. 1 through 3. In certain examples, aspects of the operations of block 1205 may be performed by a channel information component 525 or 620 as described with reference to FIGS. 4 through 7.

At block 1210, the base station 105, 105-*a* may identify a zone associated with the first base station based on the received channel measurement information. The operations of block 1210 may be performed according to the methods described with reference to FIGS. 1 through 3. In certain examples, aspects of the operations of block 1210 may be performed by a zone identifying component 530 or 625 as described with reference to FIGS. 4 through 7.

At block 1215, the base station 105, 105-*a* may receive, from a second base station, zone information associated with one or more UEs that transmitted channel measurement information to the second base station. The operations of block 1215 may be performed according to the methods described with reference to FIGS. 1 through 3. In certain examples, aspects of the operations of block 1215 may be performed by a zone information component 535 and 630 as described with reference to FIGS. 4 through 7.

At block 1220, the base station 105, 105-*a* may identify a network reuse pattern for CoMP communication based on the identified zone and the received zone information. The operations of block 1220 may be performed according to the methods described with reference to FIGS. 1 through 3. In certain examples, aspects of the operations of block 1220 may be performed by a reuse pattern identifying component 540 or 635 as described with reference to FIGS. 4 through 7.

At block 1225, the base station 105, 105-*a* may transmit a multi-point transmission to a second UE based on the identified network reuse pattern. The operations of block 1225 may be performed according to the methods described with reference to FIGS. 1 through 3. In certain examples, aspects of the operations of block 1225 may be performed by a multi-point transmission component 545 or 640 as described with reference to FIGS. 4 through 7.

Figure 13:
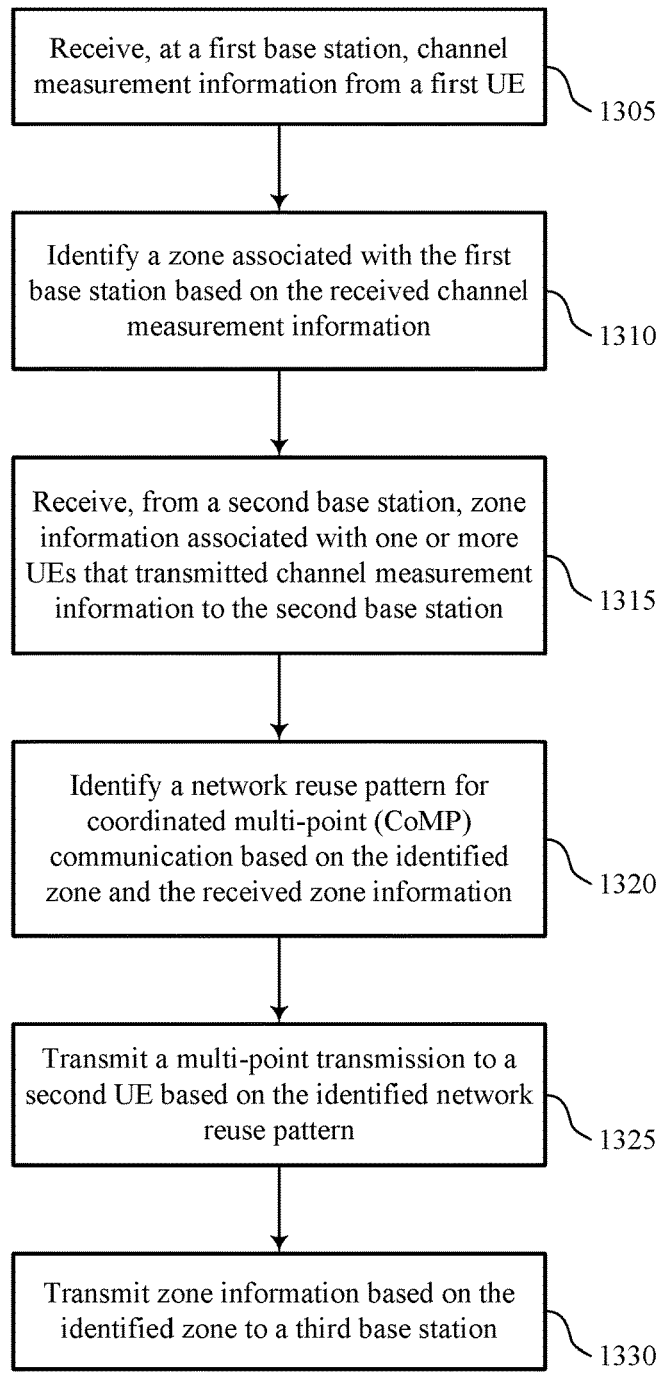

FIG. 13 shows a flowchart illustrating a method 1300 for reuse-pattern based co-ordinate multi-point transmission via distributed message exchange in accordance with various aspects of the present disclosure. The operations of method 1300 may be implemented by a base station 105, 105-*a* or its components as described herein. For example, the operations of method 1300 may be performed by a base station multi-point transmission manager 415, 515, 615, or 715 as described with reference to FIGS. 4 through 7. In some examples, a base station 105, 105-*a* may execute a set of codes to control the functional elements of the device to perform the functions described below. Additionally or alternatively, the base station 105, 105-*a* may perform aspects of the functions described below using special-purpose hardware.

At block 1305, the base station 105, 105-*a* may receive, at a first base station, channel measurement information from a first UE. The operations of block 1305 may be performed according to the methods described with reference to FIGS. 1 through 3. In certain examples, aspects of the operations of block 1305 may be performed by a channel information component 525 or 620 as described with reference to FIGS. 4 through 7.

At block 1310, the base station 105, 105-*a* may identify a zone associated with the first base station based on the received channel measurement information. The operations of block 1310 may be performed according to the methods described with reference to FIGS. 1 through 3. In certain examples, aspects of the operations of block 1310 may be performed by a zone identifying component 530 or 625 as described with reference to FIGS. 4 through 7.

At block 1315, the base station 105, 105-*a* may receive, from a second base station, zone information associated with one or more UEs that transmitted channel measurement information to the second base station. The operations of block 1315 may be performed according to the methods described with reference to FIGS. 1 through 3. In certain examples, aspects of the operations of block 1315 may be performed by a zone information component 535 and 630 as described with reference to FIGS. 4 through 7.

At block 1320, the base station 105, 105-*a* may identify a network reuse pattern for CoMP communication based on the identified zone and the received zone information. The operations of block 1320 may be performed according to the methods described with reference to FIGS. 1 through 3. In certain examples, aspects of the operations of block 1320 may be performed by a reuse pattern identifying component 540 or 635 as described with reference to FIGS. 4 through 7.

At block 1325, the base station 105, 105-*a* may transmit a multi-point transmission to a second UE based on the identified network reuse pattern. The operations of block 1325 may be performed according to the methods described with reference to FIGS. 1 through 3. In certain examples, aspects of the operations of block 1325 may be performed by a multi-point transmission component 545 or 640 as described with reference to FIGS. 4 through 7.

At block 1330, the base station 105, 105-*a* may transmit zone information based on the identified zone to a third base station. The operations of block 1330 may be performed according to the methods described with reference to FIGS. 1 through 3. In certain examples, aspects of the operations of block 1330 may be performed by a zone information transmission component 645 as described with reference to FIGS. 4 through 7.

Additionally or alternatively the base station 105, 105-*a* may transmit a multi-point transmission to the first UE based on the identified network reuse pattern. In some cases, this multi-point transmission to the first UE may be time differentiated or time shifted from other multi-point transmissions, such as one or more multi-point transmissions to one or more other UEs. These operations may be performed according to the methods described with reference to FIGS. 1 through 3. In certain examples, aspects of these operations may be performed by a reuse pattern identifying component 540 or 635 as described with reference to FIGS. 4 through 7.

Additionally or alternatively the base station 105, 105-*a* may transmit a single path transmission to a third UE based on the identified network reuse pattern. These operations may be performed according to the methods described with reference to FIGS. 1 through 3. In certain examples, aspects of these operations may be performed by a reuse pattern identifying component 540 or 635 as described with reference to FIGS. 4 through 7.

Figure 14:
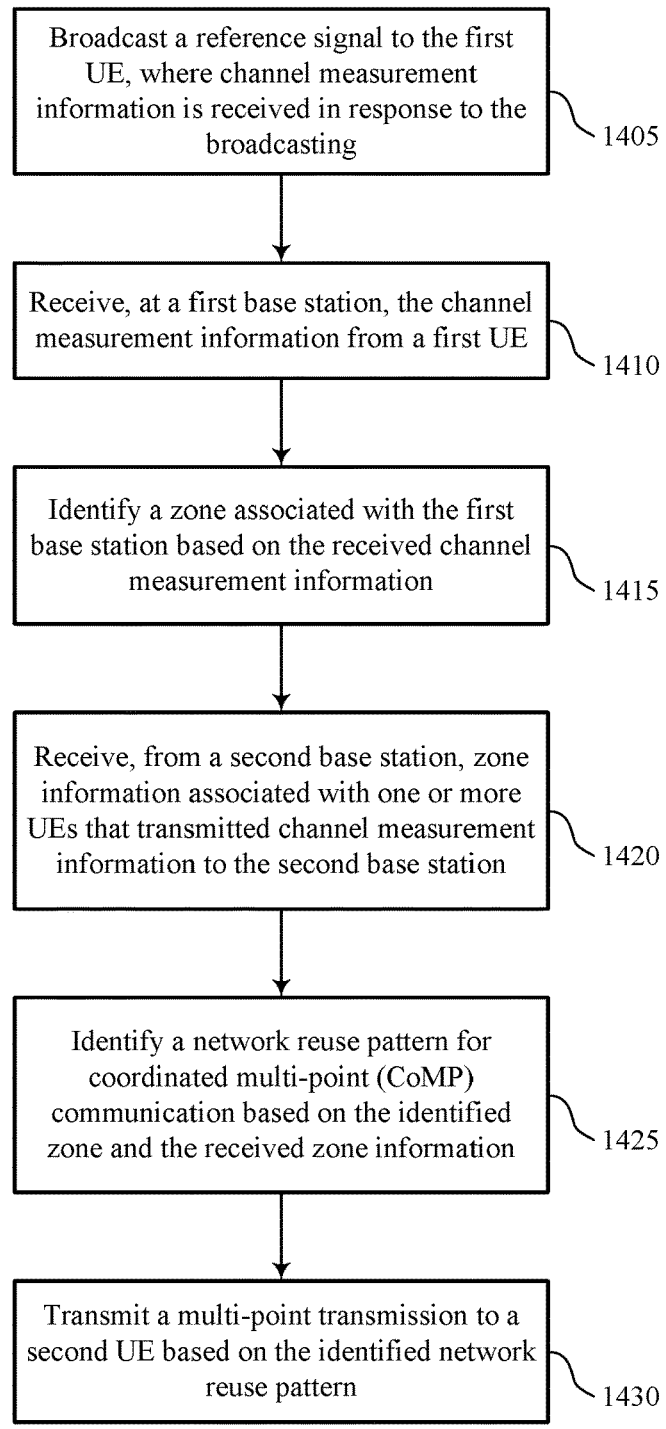

FIG. 14 shows a flowchart illustrating a method 1400 for reuse-pattern based co-ordinate multi-point transmission via distributed message exchange in accordance with various aspects of the present disclosure. The operations of method 1400 may be implemented by a base station 105, 105-*a* or its components as described herein. For example, the operations of method 1400 may be performed by a base station multi-point transmission manager 415, 515, 615, or 715 as described with reference to FIGS. 4 through 7. In some examples, a base station 105, 105-*a* may execute a set of codes to control the functional elements of the device to perform the functions described below. Additionally or alternatively, the base station 105, 105-*a* may perform aspects of the functions described below using special-purpose hardware.

At block 1405, the base station 105, 105-*a* may broadcast a reference signal to the first UE, where the channel measurement information is received in response to the broadcasting. The operations of block 1405 may be performed according to the methods described with reference to FIGS.

1 through 3. In certain examples, aspects of the operations of block 1405 may be performed by a reference signal broadcasting component 650 as described with reference to FIGS. 4 through 7.

At block 1410, the base station 105, 105-a may receive, at a first base station, channel measurement information from a first UE. The operations of block 1410 may be performed according to the methods described with reference to FIGS. 1 through 3. In certain examples, aspects of the operations of block 1410 may be performed by a channel information component 525 or 620 as described with reference to FIGS. 4 through 7.

At block 1415, the base station 105, 105-a may identify a zone associated with the first base station based on the received channel measurement information. The operations of block 1415 may be performed according to the methods described with reference to FIGS. 1 through 3. In certain examples, aspects of the operations of block 1415 may be performed by a zone identifying component 530 or 625 as described with reference to FIGS. 4 through 7.

At block 1420, the base station 105, 105-a may receive, from a second base station, zone information associated with one or more UEs that transmitted channel measurement information to the second base station. The operations of block 1420 may be performed according to the methods described with reference to FIGS. 1 through 3. In certain examples, aspects of the operations of block 1420 may be performed by a zone information component 535 and 630 as described with reference to FIGS. 4 through 7.

At block 1425, the base station 105, 105-a may identify a network reuse pattern for coordinated multi-point (CoMP) communication based on the identified zone and the received zone information. The operations of block 1425 may be performed according to the methods described with reference to FIGS. 1 through 3. In certain examples, aspects of the operations of block 1425 may be performed by a reuse pattern identifying component 540 or 635 as described with reference to FIGS. 4 through 7.

At block 1430, the base station 105, 105-a may transmit a multi-point transmission to a second UE based on the identified network reuse pattern. The operations of block 1430 may be performed according to the methods described with reference to FIGS. 1 through 3. In certain examples, aspects of the operations of block 1430 may be performed by a multi-point transmission component 545 or 640 as described with reference to FIGS. 4 through 7.

Additionally or alternatively, the base station 105, 105-a may transmit zone information based on the identified zone to a set of base stations within a network via a distributed message. These operations may be performed according to the methods described with reference to FIGS. 1 through 3. In certain examples, aspects of these operations may be performed by a zone information transmission component 645 as described with reference to FIGS. 4 through 7.

Figure 15:
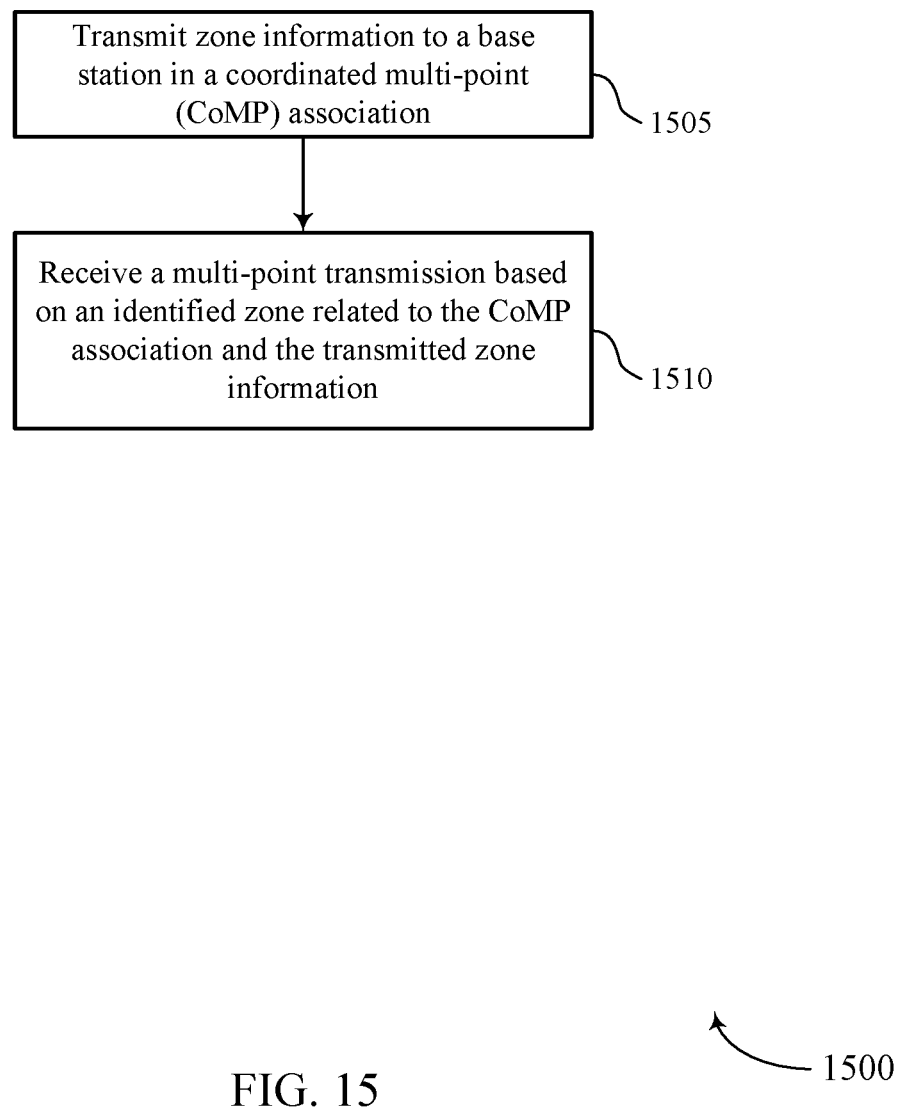

FIG. 15 shows a flowchart illustrating a method 1500 for reuse-pattern based co-ordinate multi-point transmission via distributed message exchange in accordance with various aspects of the present disclosure. The operations of method 1500 may be implemented by a UE 115 or its components as described herein. For example, the operations of method 1500 may be performed by a UE multi-point transmission manager 815, 915, 1015, or 1115 as described with reference to FIGS. 8 through 11. In some examples, a UE 115 may execute a set of codes to control the functional elements of the device to perform the functions described below. Additionally or alternatively, the UE 115 may perform aspects of the functions described below using special-purpose hardware.

At block 1505, the UE 115 may transmit zone information to a base station in a CoMP association. The operations of block 1505 may be performed according to the methods described with reference to FIGS. 1 through 3. In certain examples, aspects of the operations of block 1505 may be performed by a zone information transmission component 1020 as described with reference to FIGS. 8 through 11.

At block 1510, the UE 115 may receive a multi-point transmission based on an identified zone related to the CoMP association and the transmitted zone information. The operations of block 1510 may be performed according to the methods described with reference to FIGS. 1 through 3. In certain examples, aspects of the operations of block 1510 may be performed by a multi-point reception component 930 or 1025 as described with reference to FIGS. 8 through 11.

Figure 16:
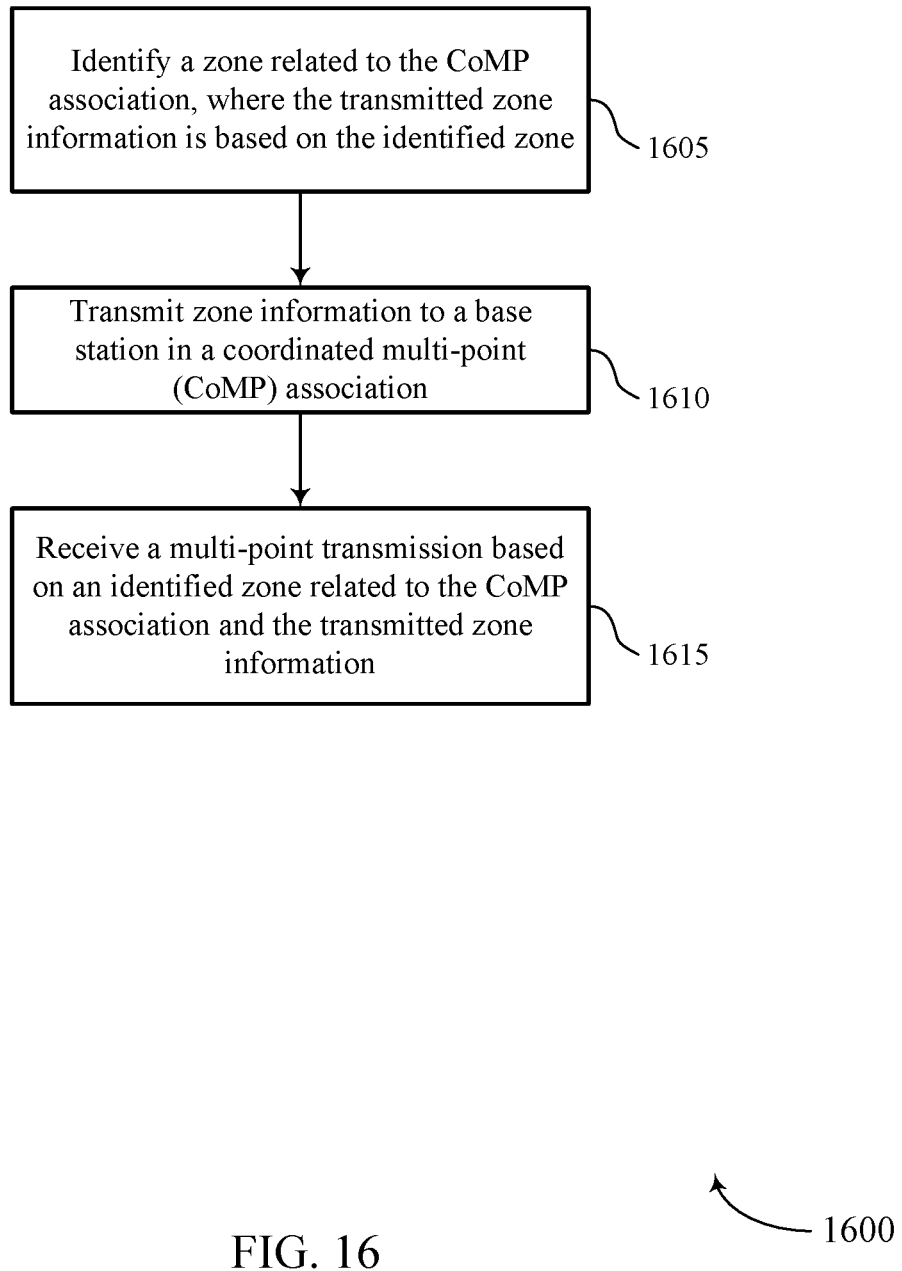

FIG. 16 shows a flowchart illustrating a method 1600 for reuse-pattern based co-ordinate multi-point transmission via distributed message exchange in accordance with various aspects of the present disclosure. The operations of method 1600 may be implemented by a UE 115 or its components as described herein. For example, the operations of method 1600 may be performed by a UE multi-point transmission manager 815, 915, 1015, or 1115 as described with reference to FIGS. 8 through 11. In some examples, a UE 115 may execute a set of codes to control the functional elements of the device to perform the functions described below. Additionally or alternatively, the UE 115 may perform aspects of the functions described below using special-purpose hardware.

At block 1605, the UE 115 may identify a zone related to the CoMP association, where the transmitted zone information is based on the identified zone. The operations of block 1605 may be performed according to the methods described with reference to FIGS. 1 through 3. In certain examples, aspects of the operations of block 1605 may be performed by a zone identifying component 1030 as described with reference to FIGS. 8 through 11.

At block 1610, the UE 115 may transmit zone information to a base station in a CoMP association. The operations of block 1610 may be performed according to the methods described with reference to FIGS. 1 through 3. In certain examples, aspects of the operations of block 1610 may be performed by a zone information transmission component 1020 as described with reference to FIGS. 8 through 11.

At block 1615, the UE 115 may receive a multi-point transmission based on an identified zone related to the CoMP association and the transmitted zone information. The operations of block 1615 may be performed according to the methods described with reference to FIGS. 1 through 3. In certain examples, aspects of the operations of block 1615 may be performed by a multi-point reception component 930 or 1025 as described with reference to FIGS. 8 through 11.

It should be noted that the methods described above describe possible implementations, and that the operations and the steps may be rearranged or otherwise modified and that other implementations are possible. Furthermore, aspects from two or more of the methods may be combined. In addition, the operations of methods 1200-1600 may be implemented by a base station 105, 105-a or its components as described herein, or a UE 115 or its components as described herein, or another device or its components as described herein, or some combination thereof. The operations of methods 1200-1600 should be limited by the discussion of example devices performing one or more operations.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM).

An orthogonal frequency division multiple access (OFDMA) system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are new releases of Universal Mobile Telecommunications System (UMTS) that use E-UTRA. UTRA, E-UTRA, UMTS, LTE, LTE-A, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE system may be described for purposes of example, and LTE terminology may be used in much of the description, the techniques described herein are applicable beyond LTE applications.

In LTE/LTE-A networks, including such networks described herein, the term evolved node B (eNB) may be generally used to describe the base stations. The wireless communications system or systems described herein may include a heterogeneous LTE/LTE-A network in which different types of evolved node B (eNBs) provide coverage for various geographical regions. For example, each eNB or base station may provide communication coverage for a macro cell, a small cell, or other types of cell. The term "cell" can be used to describe a base station, a carrier or component carrier associated with a base station, or a coverage area (e.g., sector) of a carrier or base station, depending on context.

Base stations may include or may be referred to by those skilled in the art as a base transceiver station, a radio base station, an access point, a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The DL transmissions described herein may also be called forward link transmissions while the uplink transmissions may also be called reverse link transmissions. Each communication link described herein—including, for example, wireless communications system 100 and system 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a first base station, comprising:
   receiving, at the first base station, channel measurement information from a first user equipment (UE);
   identifying a zone associated with the first base station based at least in part on the received channel measurement information;
   receiving, at the first base station from a second base station, zone information associated with one or more other UEs including a second UE that transmitted channel measurement information to the second base station;
   identifying, based at least in part on the identified zone and the received zone information, a schedule for CoMP communications during a first interval with the first UE and during a second interval with the second UE included in the one or more other UEs, the schedule based at least in part on avoiding interference between multiple transmission paths associated with CoMP communications by the first base station and the second base station with the first UE during the first interval and multiple transmission paths associated with CoMP communications by the first base station and the second base station with the second UE during the second interval;
   time shifting or time division multiplexing, based at least in part on the identified schedule for CoMP communications, the CoMP communications by the first base station and the second base station with the first UE and the CoMP communications by the first base station and the second base station with the second UE:
   transmitting a multi-point transmission to the first UE during the first interval based at least in part on the time shifting or time division multiplexing; and
   transmitting a multi-point transmission to the second UE during the second interval based at least in part on the time shifting or time division multiplexing.

2. The method of claim 1, further comprising:
   transmitting zone information based at least in part on the identified zone to a third base station.

3. The method of claim 1, further comprising:
   broadcasting a reference signal to the first UE, wherein the channel measurement information is received in response to the broadcasting.

4. The method of claim 1, wherein the channel measurement information comprises:
   a channel quality indicator, or a precoding matrix indicator, or a combination thereof.

5. The method of claim 1, wherein receiving the channel measurement information comprises:
   receiving a reference signal from the first UE.

6. The method of claim 1, further comprising:
identifying a zone associated with the second base station based at least in part on the received zone information.

7. The method of claim 1, further comprising:
comparing a received power of the channel measurement information with a threshold; and
identifying the zone associated with the second base station based at least in part on the comparing.

8. The method of claim 1, wherein the identified zone comprises:
an exclusive zone, or a serving zone, or a combination thereof.

9. The method of claim 1, wherein the identified zone is based at least in part on a location of the first base station or the first UE.

10. The method of claim 1, further comprising:
receiving the zone information from the second base station is independent of joint precoding information.

11. The method of claim 1, further comprising:
transmitting zone information based at least in part on the identified zone to a plurality of base stations within a network via a distributed message.

12. A method for wireless communications at a first UE, comprising:
transmitting zone information to a first base station in a coordinated multi-point (CoMP) association; and
receiving a multi-point transmission from the first base station and a second base station based at least in part on an identified zone related to the CoMP association, the transmitted zone information, and a schedule for CoMP communications during a first interval with the first UE and during a second interval with a second UE, the schedule based at least in part on avoiding interference between multiple transmission paths associated with CoMP communications by the first base station and the second base station with the first UE during the first interval and multiple transmission paths associated with CoMP communications by the first base station and the second base station with the second UE during the second interval, wherein the received multi-point transmission is time shifted or time division multiplexed with a second multi-point transmission transmitted to the second UE during the second interval, the time-shifting or time division multiplexing based at least in part on the schedule for CoMP communications.

13. The method of claim 12, further comprising:
identifying a zone related to the CoMP association, wherein the transmitted zone information is based at least in part on the identified zone.

14. The method of claim 12, wherein the zone information comprises:
a reference signal transmitted on a dedicated channel to the first base station.

15. The method of claim 12, wherein the zone information comprises:
a response to a reference signal received from the first base station.

16. An apparatus for wireless communications at a first base station, in a system comprising:
a processor;
memory in electronic communication with the processor; and
instructions stored in the memory and operable, when executed by the processor, to cause the apparatus to:
receive, at the first base station, channel measurement information from a first user equipment (UE);
identify a zone associated with the first base station based at least in part on the received channel measurement information;
receive, at the first base station from a second base station, zone information associated with one or more other UEs including a second UE that transmitted channel measurement information to the second base station;
identify, based at least in part on the identified zone and the received zone information, a schedule for CoMP communications during a first interval with the first UE and during a second interval with the second UE included in the one or more other UEs, the schedule based at least in part on avoiding interference between multiple transmission paths associated with CoMP communications by the first base station and the second base station with the first UE during the first interval and multiple transmission paths associated with CoMP communications by the first base station and the second base station with the second UE during the second interval;
time shift or time division multiplex, based at least in part on the identified schedule for CoMP communications, the CoMP communications by the first base station and the second base station with the first UE and the CoMP communications by the first base station and the second base station with the second UE;
transmit a multi-point transmission to the first UE during the first interval based at least in part on the time shifting or time division multiplexing; and
transmit a multi-point transmission to the second UE during the second interval based at least in part on the time shifting or time division multiplexing.

17. The apparatus of claim 16, wherein the instructions are further executable by the processor to cause the apparatus to:
transmit zone information based at least in part on the identified zone to a third base station.

18. The apparatus of claim 16, wherein the instructions are further executable by the processor to cause the apparatus to:
broadcast a reference signal to the first UE, wherein the channel measurement information is received in response to the broadcasting.

19. The apparatus of claim 16, wherein the channel measurement information comprises:
a channel quality indicator, or a precoding matrix indicator, or a combination thereof.

20. The apparatus of claim 16, wherein the instructions are further executable by the processor to cause the apparatus to:
identify a zone associated with the second base station based at least in part on the received zone information.

21. The apparatus of claim 16, wherein the instructions are further executable by the processor to cause the apparatus to:
compare a received power of the channel measurement information with a threshold; and
identify the zone associated with the second base station based at least in part on the comparing.

22. The apparatus of claim 16, wherein the identified zone comprises:
an exclusive zone, or a serving zone, or a combination thereof.

23. The apparatus of claim 16, wherein the identified zone is based at least in part on a location of the first base station or the first UE.

24. The apparatus of claim 16, wherein the instructions are further executable by the processor to cause the apparatus to:

transmit zone information based at least in part on the identified zone to a plurality of base stations within a network via a distributed message.

25. An apparatus for wireless communications at a first UE, in a system comprising:

a processor;

memory in electronic communication with the processor; and instructions stored in the memory and operable, when executed by the processor, to cause the apparatus to:

transmit zone information to a first base station in a coordinated multi-point (CoMP) association; and receive a multi-point transmission from the first base station and a second base station based at least in part on an identified zone related to the CoMP association, the transmitted zone information, and a schedule for CoMP communications during a first interval with the first UE and during a second interval with a second UE, the schedule based at least in part on avoiding interference between multiple transmission paths associated with CoMP communications by the first base station and the second base station with the first UE during the first interval and multiple transmission paths associated with CoMP communications by the first base station and the second base station with the second UE during the second interval, wherein the received multi-point transmission is time shifted or time division multiplexed with a second multi-point transmission transmitted to the second UE during the second interval, the time-shifting or time division multiplexing based at least in part on the schedule for CoMP communications.

26. The apparatus of claim 25, wherein the instructions are further executable by the processor to cause the apparatus to:

identify a zone related to the CoMP association, wherein the transmitted zone information is based at least in part on the identified zone.

27. The apparatus of claim 25, wherein the zone information comprises:

a reference signal transmitted on a dedicated channel to the first base station.

28. The apparatus of claim 25, wherein the zone information comprises:

a response to a reference signal received from the first base station.

29. The method of claim 1, wherein the schedule is identified through non-centralized communication between at least the first base station and the second base station.

* * * * *